United States Patent
Inglefield, Jr. et al.

(10) Patent No.: US 10,526,444 B2
(45) Date of Patent: Jan. 7, 2020

(54) POLYMERS CONTAINING CYCLOBUTANEDIOL AND 2,2-BIS(HYDROXYMETHYL)ALKYLCARBOXYLIC ACID

(71) Applicant: Eastman Chemical Company, Kingsport, TN (US)

(72) Inventors: David Lott Inglefield, Jr., Johnson City, TN (US); Robert Lee Eagan, Blountville, TN (US); Zhou Li, Northborough, MA (US); Glen Dennis Shields, Kingsport, TN (US); Jeremy Richard Lizotte, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 59 days.

(21) Appl. No.: 15/701,965

(22) Filed: Sep. 12, 2017

(65) Prior Publication Data
US 2018/0002482 A1 Jan. 4, 2018

Related U.S. Application Data

(62) Division of application No. 14/865,112, filed on Sep. 25, 2015, now abandoned.

(51) Int. Cl.
| | |
|---|---|
| *C08G 63/60* | (2006.01) |
| *C09D 5/03* | (2006.01) |
| *C08G 63/199* | (2006.01) |
| *C09D 167/00* | (2006.01) |
| *C09D 167/02* | (2006.01) |
| *C09D 167/04* | (2006.01) |

(52) U.S. Cl.
CPC .......... *C08G 63/60* (2013.01); *C08G 63/199* (2013.01); *C09D 5/03* (2013.01); *C09D 167/00* (2013.01); *C09D 167/02* (2013.01); *C09D 167/04* (2013.01)

(58) Field of Classification Search
CPC .... C08G 63/199; C08G 63/60; C09D 167/00; C09D 167/02; C09D 167/04; C09D 5/03
See application file for complete search history.

(56) References Cited

U.S. PATENT DOCUMENTS

| | | |
|---|---|---|
| 2,891,930 A | 6/1959 | Caldwell et al. |
| 3,018,272 A | 1/1962 | Griffing et al. |
| 3,033,822 A | 5/1962 | Kibler et al. |
| 3,075,952 A | 1/1963 | Coover, Jr. et al. |
| 3,108,083 A | 10/1963 | Laganis |
| 3,216,884 A | 11/1965 | O'Donnell |
| 3,227,764 A | 1/1966 | Martin et al. |
| 3,312,645 A | 4/1967 | George et al. |
| 3,313,777 A | 4/1967 | Elam et al. |
| 3,345,313 A | 10/1967 | Ruhf et al. |
| 3,484,339 A | 12/1969 | Caldwell |
| 3,502,620 A | 3/1970 | Caldwell |
| 3,528,947 A | 9/1970 | Lappin et al. |
| 3,538,187 A | 11/1970 | Feltzen |
| 3,734,874 A | 5/1973 | Kibler et al. |
| 3,772,227 A | 11/1973 | Kapalko et al. |
| 3,779,993 A | 12/1973 | Kibler et al. |
| 3,789,044 A | 1/1974 | Taft et al. |
| 3,800,004 A | 3/1974 | Sherwood et al. |
| 3,856,830 A | 12/1974 | Kuehn |
| 4,054,681 A | 10/1977 | Brüning et al. |
| 4,074,061 A | 2/1978 | Musser |
| 4,076,766 A | 2/1978 | Simms |
| 4,119,680 A | 10/1978 | Vachon |
| 4,120,847 A | 10/1978 | Culbertson |
| 4,196,109 A | 4/1980 | Laganis et al. |
| 4,264,671 A | 4/1981 | Gillern et al. |
| 4,267,279 A | 5/1981 | Howell |
| 4,299,933 A | 11/1981 | McConnell et al. |
| 4,304,901 A | 12/1981 | O'Neill et al. |
| 4,322,508 A | 3/1982 | Peng et al. |

(Continued)

FOREIGN PATENT DOCUMENTS

| | | |
|---|---|---|
| BE | 615850 | 7/1962 |
| CA | 740050 A | 8/1966 |

(Continued)

OTHER PUBLICATIONS

Huang et al "Effects of dimethylolpropionic acid modification on the characteristics of polyethylene terephthalate fibers" Molecular Medicine Reports 6: 709-715, 2012 (Year: 2012).*
International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.
International Search Report and Written Opinion for PCT/US2015/057524 dated Jun. 17, 2016.

(Continued)

*Primary Examiner* — Ling Siu Choi
*Assistant Examiner* — Gennadiy Mesh
(74) *Attorney, Agent, or Firm* — Matthew W. Smith

(57) ABSTRACT

Disclosed is a free flowing aqueous composition comprising (a) at least one polyester consisting of the residues of 2,2,4,4-tetramethylcyclobutane-1,3-diol; 2,2-bis(hydroxymethyl) dimethylolpropionic acid; and at least one polycarboxylic acid and/or a derivative thereof selected from the group consisting of 1,2-cyclohexanedicarboxylic, 1,3-cyclohexanedicarboxylic, 1,4-cyclohexanedicarboxylic and adipic acid, wherein said polyester has an acid number in the range of 10 to 100 mg KOH/g, a hydroxyl number in the range of 20 to 120 mg KOH/g and a number average molecular weight of 500 to 5000; (b) at least one neutralizing agent; and (c) water. The composition is useful in aqueous coating compositions.

3 Claims, No Drawings

(56) References Cited

U.S. PATENT DOCUMENTS

| | | | |
|---|---|---|---|
| 4,338,379 A | 7/1982 | Strolle et al. | |
| 4,350,807 A | 9/1982 | McConnell et al. | |
| 4,363,908 A | 12/1982 | Joyner et al. | |
| 4,397,989 A | 8/1983 | Adesko | |
| 4,433,119 A | 2/1984 | Brode et al. | |
| 4,476,261 A * | 10/1984 | Patzschke | C08G 18/4009 204/496 |
| 4,480,077 A | 10/1984 | Hefner, Jr. | |
| 4,525,504 A | 6/1985 | Morris et al. | |
| 4,525,544 A | 6/1985 | Nelson et al. | |
| 4,581,093 A | 4/1986 | Noyes et al. | |
| 4,585,854 A | 4/1986 | Tung et al. | |
| 4,698,391 A | 10/1987 | Yacobucci et al. | |
| 4,716,200 A | 12/1987 | Berghoff | |
| 4,724,173 A | 2/1988 | Rockett et al. | |
| 4,737,551 A | 4/1988 | Dervan et al. | |
| 4,751,267 A | 6/1988 | Berghoff | |
| 4,771,101 A | 9/1988 | Pruett et al. | |
| 4,859,760 A | 8/1989 | Light, Jr. et al. | |
| 4,910,292 A | 3/1990 | Blount | |
| 4,939,233 A | 7/1990 | Jenkins et al. | |
| 4,959,259 A | 9/1990 | Guilbaud | |
| 5,017,679 A | 5/1991 | Chang et al. | |
| 5,023,367 A | 6/1991 | Calbo, Jr. et al. | |
| 5,025,086 A | 6/1991 | Blount, Jr. et al. | |
| 5,097,006 A | 3/1992 | Kapilow et al. | |
| 5,124,388 A | 6/1992 | Pruett et al. | |
| 5,160,792 A | 11/1992 | Barbee et al. | |
| 5,218,042 A | 6/1993 | Kuo et al. | |
| 5,245,002 A | 9/1993 | Kuo | |
| 5,254,637 A | 10/1993 | Witzeman et al. | |
| 5,256,759 A | 10/1993 | Kuo | |
| 5,256,761 A | 10/1993 | Blount, Jr. | |
| 5,288,820 A | 2/1994 | Rector, Jr. et al. | |
| 5,290,631 A | 3/1994 | Fleury et al. | |
| 5,306,567 A | 4/1994 | Kuo et al. | |
| 5,321,118 A | 6/1994 | Hubbs et al. | |
| 5,326,820 A | 7/1994 | Hoffmann et al. | |
| 5,344,872 A | 9/1994 | Debord et al. | |
| 5,349,026 A | 9/1994 | Emmons et al. | |
| 5,369,210 A | 11/1994 | George et al. | |
| 5,371,148 A | 12/1994 | Taylor et al. | |
| 5,393,609 A | 2/1995 | Chang et al. | |
| 5,393,840 A | 2/1995 | Kuo | |
| 5,393,849 A | 2/1995 | Srinivasan et al. | |
| 5,397,641 A | 3/1995 | Moens et al. | |
| 5,416,187 A | 5/1995 | Kuo et al. | |
| 5,439,988 A | 8/1995 | Moens et al. | |
| 5,453,464 A | 9/1995 | Witzeman et al. | |
| 5,464,909 A | 11/1995 | Chang et al. | |
| 5,498,668 A | 3/1996 | Scott | |
| 5,541,268 A | 7/1996 | Fenn et al. | |
| 5,554,701 A | 9/1996 | Chang et al. | |
| 5,596,037 A | 1/1997 | Moens et al. | |
| 5,596,049 A | 1/1997 | Gallucci et al. | |
| 5,646,237 A | 7/1997 | George et al. | |
| 5,654,347 A | 8/1997 | Khemani et al. | |
| 5,663,266 A | 9/1997 | Taylor et al. | |
| 5,696,176 A | 12/1997 | Khemani et al. | |
| 5,852,120 A | 12/1998 | Bederke | |
| 5,919,873 A | 7/1999 | Irving | |
| 5,932,641 A | 8/1999 | Blanchard et al. | |
| 5,955,565 A | 9/1999 | Morris et al. | |
| 5,993,975 A | 11/1999 | Tanaka et al. | |
| 6,087,464 A | 7/2000 | Swarup et al. | |
| 6,120,851 A | 9/2000 | Borgholte et al. | |
| 6,184,311 B1 | 2/2001 | O'Keeffe et al. | |
| 6,211,309 B1 | 4/2001 | McIntosh et al. | |
| 6,248,843 B1 | 6/2001 | Panandiker et al. | |
| 6,255,366 B1 | 7/2001 | Adams et al. | |
| 6,265,072 B1 | 7/2001 | Fagerburg | |
| 6,346,582 B1 | 2/2002 | Kooijmans et al. | |
| 6,423,816 B1 | 7/2002 | Wamprecht et al. | |
| 6,444,781 B1 | 9/2002 | Kuo et al. | |
| 6,780,523 B2 | 8/2004 | Kuo et al. | |
| 6,841,604 B2 | 1/2005 | Bayer et al. | |
| 6,887,937 B1 | 5/2005 | Vandevoorde et al. | |
| 6,992,133 B2 | 1/2006 | Yokoyama et al. | |
| 6,995,194 B2 | 2/2006 | Moens et al. | |
| 7,087,672 B2 | 8/2006 | Yuan et al. | |
| 7,141,625 B2 | 11/2006 | Komazaki et al. | |
| 8,163,850 B2 | 4/2012 | Marsh et al. | |
| 8,168,721 B2 | 5/2012 | Marsh et al. | |
| 8,324,316 B2 | 12/2012 | Powell et al. | |
| 8,449,960 B2 | 5/2013 | Skillman et al. | |
| 8,492,465 B2 | 7/2013 | Seibold et al. | |
| 8,519,055 B2 | 8/2013 | Marsh et al. | |
| 8,524,834 B2 | 9/2013 | Marsh et al. | |
| 8,580,872 B2 | 11/2013 | Kuo et al. | |
| 8,663,765 B2 | 3/2014 | Skillman et al. | |
| 9,029,460 B2 | 5/2015 | Marsh et al. | |
| 9,029,461 B2 | 5/2015 | Marsh et al. | |
| 9,034,964 B2 | 5/2015 | Kuo et al. | |
| 9,090,741 B2 | 7/2015 | Morschhaeuser et al. | |
| 9,096,772 B2 | 8/2015 | Lespinasse et al. | |
| 9,200,177 B2 | 12/2015 | Young et al. | |
| 9,487,619 B2 | 11/2016 | Kuo et al. | |
| 9,598,602 B2 | 3/2017 | Kuo et al. | |
| 9,650,539 B2 | 5/2017 | Kuo et al. | |
| 2001/0051706 A1 | 12/2001 | George et al. | |
| 2002/0086154 A1 | 7/2002 | Miller et al. | |
| 2002/0103329 A1 | 8/2002 | Koldijk et al. | |
| 2003/0083425 A1 | 5/2003 | Morimoto et al. | |
| 2003/0113462 A1 | 6/2003 | Hirose et al. | |
| 2003/0205852 A1 | 11/2003 | Porter | |
| 2004/0024140 A1 | 2/2004 | Fujita et al. | |
| 2004/0087736 A1 | 5/2004 | Wu et al. | |
| 2005/0176859 A1 | 8/2005 | Tinkl et al. | |
| 2006/0079650 A1 | 4/2006 | Stevenson et al. | |
| 2006/0286383 A1 | 12/2006 | Gilmer | |
| 2007/0020557 A1 | 1/2007 | Yao et al. | |
| 2007/0092746 A1 | 4/2007 | Wayton et al. | |
| 2007/0232778 A1 | 10/2007 | Moody et al. | |
| 2007/0276065 A1 | 11/2007 | Barton et al. | |
| 2008/0092776 A1 | 4/2008 | Stockl et al. | |
| 2008/0135060 A1 | 6/2008 | Kuo et al. | |
| 2008/0139687 A1 | 6/2008 | Woods et al. | |
| 2009/0047524 A1 | 2/2009 | Yaoi et al. | |
| 2009/0110843 A1 | 4/2009 | Halahmi et al. | |
| 2010/0159176 A1 | 6/2010 | Hale et al. | |
| 2010/0204363 A1 | 8/2010 | Marsh et al. | |
| 2010/0204388 A1 | 8/2010 | Marsh et al. | |
| 2010/0204392 A1 | 8/2010 | Marsh et al. | |
| 2010/0204401 A1 | 8/2010 | Marsh et al. | |
| 2010/0204413 A1 | 8/2010 | Powell et al. | |
| 2010/0297422 A1 | 11/2010 | Lucas | |
| 2011/0232002 A1 | 9/2011 | Wiessner | |
| 2011/0315591 A1 | 12/2011 | Lespinasse et al. | |
| 2012/0101187 A1 | 4/2012 | Kuo et al. | |
| 2012/0172520 A1 | 7/2012 | Marsh et al. | |
| 2012/0202920 A1 | 8/2012 | Marsh et al. | |
| 2012/0264669 A1 | 10/2012 | Cristobal et al. | |
| 2013/0023604 A1 | 1/2013 | Kuo et al. | |
| 2013/0072628 A1 | 3/2013 | Crawford et al. | |
| 2013/0296470 A1 | 11/2013 | Marsh et al. | |
| 2013/0296488 A1 | 11/2013 | Marsh et al. | |
| 2013/0324640 A1 | 12/2013 | Parish | |
| 2014/0018496 A1 | 1/2014 | Kuo et al. | |
| 2014/0128265 A1 | 5/2014 | Wacker | |
| 2014/0256852 A1 | 9/2014 | Vandezande et al. | |
| 2014/0296406 A1 | 10/2014 | Marsh et al. | |
| 2014/0296407 A1 | 10/2014 | Marsh et al. | |
| 2014/0303283 A1 | 10/2014 | Ding et al. | |
| 2014/0303303 A1 | 10/2014 | Benson | |
| 2014/0348776 A1 | 11/2014 | Palmer, Jr. et al. | |
| 2015/0034522 A1 | 2/2015 | Itou et al. | |
| 2015/0099827 A1 | 4/2015 | Hagiwara et al. | |
| 2015/0099837 A1 | 4/2015 | Argyropoulos et al. | |
| 2016/0115274 A1 | 4/2016 | Kuo et al. | |
| 2016/0115345 A1 | 4/2016 | Kuo et al. | |
| 2016/0115347 A1 | 4/2016 | Kuo et al. | |
| 2016/0115348 A1 | 4/2016 | Kuo et al. | |

(56) References Cited

U.S. PATENT DOCUMENTS

| | | | |
|---|---|---|---|
| 2016/0280956 A1 | 9/2016 | Kuo et al. | |
| 2016/0340471 A1 | 11/2016 | Zhou et al. | |
| 2017/0088665 A1 | 3/2017 | Inglefiled et al. | |

FOREIGN PATENT DOCUMENTS

| | | |
|---|---|---|
| CA | 2 111 927 A1 | 6/1994 |
| EP | 1 273 626 A1 | 1/2003 |
| EP | 1 647 564 | 4/2006 |
| EP | 2365036 A1 | 9/2011 |
| GB | 1 044 015 | 9/1966 |
| GB | 1 115 189 A | 5/1968 |
| GB | 1 130 558 | 10/1968 |
| GB | 2 025 998 B | 10/1982 |
| JP | 03-038281 | 2/1991 |
| JP | 08-073781 | 3/1996 |
| JP | 09-003341 | 1/1997 |
| JP | 2002-235038 | 8/2002 |
| JP | 2004-339493 A | 12/2004 |
| JP | 2006-233068 | 9/2006 |
| WO | WO 93/04125 | 3/1993 |
| WO | WO 94/01506 | 1/1994 |
| WO | WO 94/12557 | 6/1994 |
| WO | WO 95/01407 | 1/1995 |
| WO | WO 96/33229 | 10/1996 |
| WO | WO 01/48097 A1 | 7/2001 |
| WO | WO 02/066541 A1 | 8/2002 |
| WO | WO 2006/083343 | 8/2006 |
| WO | WO 2006/138198 | 12/2006 |
| WO | WO 2007-001567 | 1/2007 |
| WO | WO 2007/001571 A1 | 1/2007 |
| WO | WO 2007/078851 | 7/2007 |
| WO | WO 2009/085097 A1 | 7/2009 |
| WO | WO 2009/156457 A1 | 12/2009 |
| WO | WO 2013/098218 A1 | 7/2013 |
| WO | WO 2013/169459 * | 11/2013 |
| WO | WO 2014/203857 A1 | 12/2014 |
| WO | WO 2015/156094 A1 | 10/2015 |

OTHER PUBLICATIONS

Anonymous, "The Use of Cycloaliphatic Diacids and Anhydrides as Monomers for Polyester Polymers to Improve their Compatibility with Acrylic Polymers", Research Disclosure, 360, (1994), pp. 229-230.

Couchman, P. R.; "Compositional Variation of Glass-Transition Temperatures. 2. Application of the Thermodynamic Theory to Compatible Polymer Blends"; Macromolecules 1978, 11(6); pp. 1156-1161.

Heidt, et al., "Florida weathering of Isophthalic Acid-Based, Melamine-Crosslinked Polyester Coatings", Proceedings of the Twenty-Seventh International Waterborne, High Solids and Powder Coatings Symposium (2000), $27^{th}$ 295-307.

Husbands, M.J., et al., "Polyester Resins", A Manual of Resins for Surface Coatings, vol. III, pp. 63-167.

Jorissen, D.A., et al., "Higher Solids Polyurethane Coatings", Proceedings of the International Waterborne, High-Solids and Powder Coatings Symposium, (1992), $19^{th}$ ed. pp. 182-195.

"Coating Processes (Powder Technology)"; Kirk-Othmer Encyclopedia of Chemical Technology, $4^{th}$ Edition, vol. 6, p. 641.

Ni, Hai, et al., "Cycloaliphatic Polyester Based High Solids Polyurethane Coatings: I. The Effect of Difunctional Alcohols", Journal of Coatings Technology, vol. 74, No. 928 (2002), pp. 49-56.

Oldring, P.K.T., et al., "Vinyl and Acrylic Monomers", A Manual of Resins for Surface Coatings, vol. II, pp. 121-210.

Oldring, P.K.T. et al.; Resins for Surface Coatings; vol. III; pp. 63-167; SITA Technology; London, UK; 1987.

Seo, Kab S., et al. "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.

Vandevoorde, P., et al. "Making solid gains Novel acrylic and polyester polyols reduce VOCs in solventborne urethanes", European Coatings Journal (2005) (9) pp. 22-24, 26-29.

Wicks, Zeno Jr., et al., "Polyester Resins", Organic Coatings Science and Technology, $2^{nd}$ ed., 13, (1999), p. 246-257.

Co-pending U.S. Appl. No. 15/078,537, filed Mar. 23, 2016, Zhou et al.

Non-Final Office Action dated Jul. 11, 2017 received in co-pending U.S. Appl. No. 15/078,537.

International Search Report and Written Opinion for PCT/US2015/057529 dated Jan. 27, 2016.

International Search Report and Written Opinion for PCT/US2012/045357 dated Sep. 24, 2012.

ASTM D522; Standard Test Methods for Mandrel Bend Test of Attached Organic Coatings.

ASTM D1639-90; Standard Test Method for Acid Value of Organic Coating Materials.

ASTM D2794; Standard Test Method for Resistance of Organic Coatings to the Effect of Rapid Deformation (Impact).

ASTM D3281; Standard Test Method for Formability of Attached Organic Coatings with Impact-Wedge Bend Apparatus.

ASTM D3359-0962; Standard Test Methods for Measuring Adhesion by Tape Test.

ASTM D3363; Standard Test Method for Film Hardness by Pencil Test.

ASTM D3418; Standard Test Method for Transition Temperatures and Enthalpies of Fusion and Crystallization of Polymers by Differential Scanning Calorimetry.

ASTM D4274-11; Standard Test Methods for Testing Polyurethane Raw Materials: Determination of Hydroxyl Numbers of Polyols.

ASTM D4287; Standard Test Method for High-Shear Viscosity Using a Cone/Plate Viscometer.

ASTM D4366; Standard Test Method for Hardness of Organic Coatings by Pendulum Damping Tests.

ASTM D4752-10; Standard Practice for Measuring MEK Resistance of Ethyl Silicate (Inorganic) Zinc-Rich Primers by Solvent Rub.

ASTM D5402-15; Standard Practice for Assessing the Solvent Resistance of Organic Coatings Using Solvent Rubs.

ASTM D6279; Standard Test Method for Rub Abrasion Mar Resistance of High Gloss Coatings.

Biedermann et al.; "Phenolic resins for can coatings: II. Resoles based on cresol/phenol mixtures of tert. butyl phenol"; LWT—Food Science and Technology; 39; (2006); pp. 647-659 (Elsevier).

Narayan et al.; "Properties of acetoacetylated hydroxylated polyesters based polyurethane coatings"; Progress in Organic Coatings; 45; (2002); pp. 59-67.

The Chemisty of Polyurethane Coatings, Technical Publication, p. 20, by Bayer Material Science, 2005.

Witzeman et al.; "Comparison of Methods for the Preparation of Acetoacetylated Coating Resins"; Journal of Coatings Technology; vol. 62; No. 789; Oct. 1990; pp. 101-112.

Zhang, Musan et al.; "Tailoring adhesive performance of sulfonated segmented block copolymers"; Database CA [Online]; Chemical Abstracts Service; XP002682877.

International Search Report and Written Opinion for PCT/US2016/32646 dated Aug. 16, 2016.

International Search Report and Written Opinion for PCT/US16/52810 dated Dec. 15, 2016.

Co-pending U.S. Appl. No. 15/435,353, filed Feb. 17, 2017, Dziczkowski et al.

Dyab et al.; "Non-Aqueous Emulsions Stabilised by Nonionic Nonyl Phenol Ethoxylate Reactive Polymerisable Surfactants"; International Journal of Electrochemical Science; 8; 2013; pp. 9868-9885.

Stepan Product Bulletin for MAKON® TSP-12, TSP-16, TSP-20, TSP-25, TSP-40 & TSP-60.

Vogel et al.; "Near-Zero VOC Waterborne Alkyd Dispersions with Solventborne Alkyd Performance"; CoatingsTech; Jun. 2016; pp. 29-39.

International Search Report and Written Opinion for PCT/US2017/018563 dated Apr. 6, 2017.

(56) References Cited

OTHER PUBLICATIONS

International Search Report and Written Opinion for PCT/US2017/022885 dated May 25, 2017.
Non-Final Office Action dated May 30, 2018 received in co-pending U.S. Appl. No. 14/716,027.
Co-pending U.S. Appl. No. 15/846,388, filed Dec. 19, 2017, Zhou et al.
Final Office Action dated Jan. 12, 2018 received in co-pending U.S. Appl. No. 15/078,537.
Notice of Allowance dated May 1, 2018 received in co-pending U.S. Appl. No. 15/078,537.
European Search Report dated Mar. 26, 2019 received in European Application No. 16849473.0.
Non-Final Office Action dated Oct. 9, 2019 received in co-pending U.S. Appl. No. 15/846,388.

* cited by examiner

POLYMERS CONTAINING CYCLOBUTANEDIOL AND 2,2-BIS (HYDROXYMETHYL)ALKYLCARBOXYLIC ACID

CROSS REFERENCE TO RELATED APPLICATIONS

This application is a Divisional of U.S. patent application Ser. No. 14/865,112, filed Sep. 25, 2015, the contents of which are incorporated herein by reference in their entirety.

FIELD OF THE INVENTION

This invention pertains to the improvement of polymer resins containing 2,2-bis(hydroxymethyl)alkylcarboxylic acid (BIS-MCA) through the incorporation of cyclobutanediol.

BACKGROUND OF THE INVENTION

There is a need in the art for new and improved polymeric and/or copolymeric materials that are useful in several end-use applications, for example, coatings, thermoplastic polyesters, composites, paints and inks.

It would be useful in the art to have greater synthetic versatility in polymer reactions containing 2,2-bis(hydroxymethyl)alkylcarboxylic acid (BIS-MCA). It would also be useful in the art to have increased dispersibility and hydrolytic stability of polyester dispersions. It would further be useful in the art for polyesters to have enhanced coatings properties such as improved mechanical properties and improved weathering properties. It would also be desirable to have a balance of two or more of properties such as toughness, weatherability, hydrolytic stability and increased dispersibility.

SUMMARY OF THE DISCLOSURE

This invention relates to a polyester composition comprising a polyester further comprising residues of:
(a) at least one cyclobutanediol;
(b) at least one 2,2-bis(hydroxymethyl)alkylcarboxylic acid and/or a derivative thereof; and
(c) at least one polycarboxylic acid and/or a derivative thereof.

It has been discovered that the incorporation of cyclobutanediol into 2,2-bis(hydroxymethyl)alkylcarboxylic acid (BIS-MCA)-containing polyesters can allow for improvement of certain properties not believed to be known or expected in the art. The polyesters can have at least one or more of the following properties: toughness, weatherability, hydrolytic stability and increased dispersibility.

For example, the improved properties can include but are not limited to one or more of or any combination of the following: (1) cyclobutanediol can allow for greater synthetic versatility in reactions containing BIS-MCA; (2) cyclobutanediol can enhance the dispersibility (including water dispersibility) and hydrolytic stability of polyester dispersions containing BIS-MCA; (3) inclusion of cyclobutanediol and BIS-MCA into polymers can lead to enhanced coating properties, such as mechanical properties, and weathering; and (4) polymers containing cyclobutanediol and BIS-MCA provide another alternative to other polymers known in the art.

DETAILED DESCRIPTION OF THE DISCLOSURE

The present invention may be understood more readily by reference to the following detailed description of certain embodiments of the invention and the working examples. Other embodiments are described in other sections of this disclosure as well.

Polyesters are typically synthesized using one or more polyhydroxyl compounds and one or more polycarboxylic acid compounds. It is also customary to incorporate monofunctional- and/or polyfunctional-hydroxyl or acid components into the polymer chains in order to modify their structures. The term "polyester", as used herein, is intended to include "copolyesters" as well. It is to be understood that the term, hydroxyl components, described in this disclosure is meant to include alcohols having one or more hydroxyl (OH) functionalities. Similarly, the term, carboxylic acid components, is meant to include carboxylic acids having one or more carboxyl (COOH) functionalities. Further, it is recognized by one skilled in the art that polyester can also be synthesized by using a polyhydroxyl and a derivative of a polycarboxylic such as, for example, dimethyl ester or other dialkyl esters of a diacid, or diacid chloride or other diacid halides, or acid anhydride. Thus, it is to be understood that the term, carboxylic acid component, described in the invention is meant to include an acid as well as its derivatives that are capable of forming an ester with an alcohol. The term "residue", as used herein, means any organic structure incorporated into a polymer through a polycondensation and/or an esterification reaction from the corresponding monomer. For example, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a glycol, including a diol, to make polyester. Furthermore, as used in this application, the term "diacid" includes multifunctional acids, for example, branching agents. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester. For example, dimethyl terephthalate may be used as the starting material. In yet another embodiment, mixtures of terephthalic acid and dimethyl terephthalate may be used as the starting material and/or as an intermediate material. Any method known to one of ordinary skill in the art can be used in making the polyesters useful in the invention. In one embodiment, the total reaction time for making the polyester can be: less than 500 minutes, less than 490 minutes, or less than 450 minutes, or less than 400 minutes, or less than 350 minutes, or less than 300 minutes, or less than 280 minutes, or less than 250 minutes.

In one embodiment, at least one polycarboxylic acid and/or a derivative thereof can be aliphatic. In one embodiment, at least one polycarboxylic acid and/or a derivative thereof can be aromatic. In one embodiment, there can be mixtures of at least one aliphatic polycarboxylic acid and/or a derivative thereof and at least one aromatic polycarboxylic acid and/or a derivative thereof.

In one embodiment, the at least one aliphatic polycarboxylic acid can be chosen from 1,2-cyclohexanedicarboxylic, 1,3-cyclohexanedicarboxylic, 1,4-cyclohexanedicarboxylic, fumaric, succinic, adipic, glutaric, azelaic, sebacic, resorcinol diacetic, and/or diglycolic acid. In one embodiment, the at least one aliphatic acid can be chosen from 1,4-cyclohexanedicarboxylic acid and adipic acid. In one embodiment, the at least one aliphatic acid can be 1,4-cyclohexanedicarboxylic acid. In one embodiment, the at least one aliphatic acid can be adipic acid.

In one embodiment, the at least one aromatic polycarboxylic acid can be chosen from naphthalenedicarboxylic, phthalic, terephthalic, isophthalic, 4,4'-oxybis(benzoic), biphenyldicarboxylic, 4,4'-methylenedibenzoic, trans-4,4'-stilbenedicarboxylic, and sulfoisophthalic acids. In one embodiment, the polyesters useful in the invention do not include isophthalic acid. In one embodiment, the polyesters useful in the invention to do not include sulfoisophthalic acid. In one embodiment, the polyesters useful in this invention do not include sodiosulfoisophthalic acid.

In one embodiment, the BIS-MCA can be any known in the art including but not limited to one or more of the following: 2,2-bis(hydroxymethyl)propionic acid (DMPA), 2,2-bis(hydroxymethyl)butanoic acid (DMBA), 2,2-bis(hydroxymethyl)pentanoic acid (DMPTA) and 2,2-bis(hydroxymethyl)hexanoic acid (DMHA).

In one embodiment, the cyclobutanediol is a 2,2,4,4-tetraalkylcyclobutane-1,3-diol (TACD). The alkyl group can have from 1 to 8 carbon atoms. In one embodiment, the 2,2,4,4-tetraalkylcyclobutane-1,3-diol (TACD) can be 2,2,4,4-tetramethylcyclobutane-1,3-diol (TMCD).

In one embodiment, this invention provides a polyester, comprising the residues of the following: (a) TACD; (b) DMPA; (c) optionally, a polyhydroxyl compound other than TACD and DMPA, and (d) a polycarboxylic acid compound, a derivative of polycarboxylic acid compound, or a combination thereof.

In one embodiment, this invention provides a polyester, comprising the residues of the following: (a) 2,2,4,4-tetramethyl-1,3-cyclobutanediol (TMCD); (b) DMPA; (c) optionally, a polyhydroxyl compound other than TMCD and DMPA; and (d) a polycarboxylic acid compound, a derivative of polycarboxylic acid compound, or a combination thereof.

In one embodiment, this invention provides a curable polyester, comprising the residues of the following: (a) TACD; (b) DMPA; (c) optionally, a polyhydroxyl compound other than TACD and DMPA, and (d) a polycarboxylic acid compound, a derivative of polycarboxylic acid compound, or a combination thereof.

In one embodiment, this invention provides a curable polyester, comprising the residues of the following: (a) 2,2,4,4-tetramethyl-1,3-cyclobutanediol (TMCD); (b) DMPA; (c) optionally, a polyhydroxyl compound other than TMCD and DMPA; and (d) a polycarboxylic acid compound, a derivative of polycarboxylic acid compound, or a combination thereof.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol, defined by the following formula:

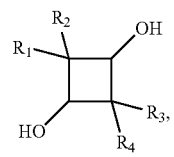

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical; for example, 2,2,4,4-tetramethyl-1,3-cyclobutanediol;

(b) at least one BIS-MCA and/or a derivative thereof; and (c) at least one polycarboxylic acid and/or a derivative thereof.

In one embodiment, there is provided a polyester composition wherein the polyester comprises residues of:

(a) 2,2,4,4-tetramethylcyclobutane-1,3-diol;

(b) at least one BIS-MCA and/or a derivative thereof; and (c) at least one polycarboxylic acid and/or a derivative thereof.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

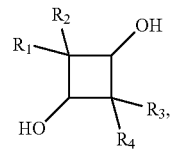

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical, for example, 2,2,4,4-tetramethyl-1,3-cyclobutanediol;

(b) at least one BIS-MCA and/or a derivative thereof wherein the alkyl group of said BIS-MCA can be C1-C8, or in one embodiment, C1-C3 or in one embodiment, C1; and (c) at least one polycarboxylic acid and/or a derivative thereof.

In one embodiment, there is provided a polyester composition wherein the polyester comprises residues of:

(a) 2,2,4,4-tetramethylcyclobutane-1,3-diol;

(b) at least one BIS-MCA and/or a derivative thereof wherein the alkyl group of said BIS-MCA can be C1-C8, or in one embodiment, C1-C3 or in one embodiment, C1; and (c) at least one polycarboxylic acid and/or a derivative thereof.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol, defined by the following formula:

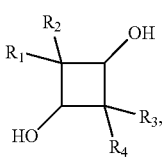

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical; for example, 2,2,4,4-tetramethyl-1,3-cyclobutanediol;

(b) at least one 2,2-bis(hydroxymethyl)alkylcarboxylic acid and/or a derivative thereof selected from selected from at least one of 2,2-bis(hydroxymethyl)propionic acid, 2,2-bis(hydroxymethyl)butanoic acid, 2,2-bis(hydroxymethyl)pentanoic acid, and 2,2-bis(hydroxymethyl)hexanoic acid; and (c) at least one polycarboxylic acid and/or a derivative thereof.

In one embodiment, there is provided a polyester composition wherein the polyester comprises residues of:

(a) 2,2,4,4-tetramethylcyclobutane-1,3-diol;

(b) at least one 2,2-bis(hydroxymethyl)alkylcarboxylic acid and/or a derivative thereof selected from selected from at least one of 2,2-bis(hydroxymethyl)propionic acid, 2,2-bis(hydroxymethyl)butanoic acid, 2,2-bis(hydroxymethyl)pentanoic acid, and 2,2-bis(hydroxymethyl)hexanoic acid; and (c) at least one polycarboxylic acid and/or a derivative thereof.

In one embodiment, there is provided a polyester composition: wherein the polyester comprises residues of:

(a) at least one cyclobutanediol, for example, a cyclobutanediol which is a 2,2,4,4-tetraalkylcyclobutane-1,3-diol defined by the following formula:

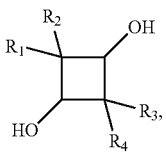

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical; for example, 2,2,4,4-tetramethyl-1,3-cyclobutanediol;

(b) 2,2-bis(hydroxymethyl)propionic acid; and (c) at least one aliphatic polycarboxylic acid and/or at least one aromatic polycarboxylic acid and/or derivatives of each, or mixtures thereof.

In one embodiment, there is provided a polyester composition wherein the polyester comprises residues of:

(a) 2,2,4,4-tetramethylcyclobutane-1,3-diol;

(b) 2,2-bis(hydroxymethyl)propionic acid; and (c) at least one aliphatic polycarboxylic acid and/or at least one aromatic polycarboxylic acid and/or derivatives of each, or mixtures thereof.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

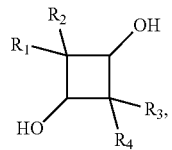

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) at least one BIS-MCA and/or a derivative thereof; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids. In one embodiment, there is provided a polyester composition wherein the polyester comprises residues of:

(a) 2,2,4,4-tetramethylcyclobutane-1,3-diol;

(b) at least one BIS-MCA and/or a derivative thereof; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

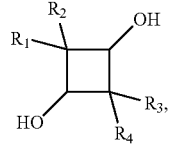

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) at least one BIS-MCA and/or a derivative thereof wherein the alkyl group of said BIS-MCA can be C1-C8, or in one embodiment, C1-C3 or in one embodiment, C1; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids.

In one embodiment, there is provided a polyester composition wherein the polyester comprises residues of:

(a) 2,2,4,4-tetramethylcyclobutane-1,3-diol;

(b) at least one BIS-MCA and/or a derivative thereof wherein the alkyl group of said BIS-MCA can be C1-C8, or in one embodiment, C1-C3 or in one embodiment, C1; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids.

In one embodiment, there is provided a polyester composition wherein the polyester comprises residues of:

(a) at least one cyclobutanediol, for example, a cyclobutandiol which is a 2,2,4,4-tetraalkylcyclobutane-1,3-diol defined by the following formula:

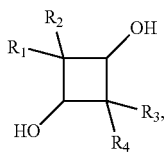

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) at least one 2,2-bis(hydroxymethyl)alkylcarboxylic acid and/or a derivative thereof selected from selected from at least one of 2,2-bis(hydroxymethyl)propionic acid, 2,2-bis(hydroxymethyl)butanoic acid, 2,2-bis(hydroxymethyl)pentanoic acid, and 2,2-bis(hydroxymethyl)hexanoic acid; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids.

In one embodiment, there is provided a polyester composition wherein the polyester comprises residues of:

(a) 2,2,4,4-tetramethylcyclobutane-1,3-diol;

(b) at least one 2,2-bis(hydroxymethyl)alkylcarboxylic acid and/or a derivative thereof selected from selected from at least one of 2,2-bis(hydroxymethyl)propionic acid, 2,2-bis(hydroxymethyl)butanoic acid, 2,2-bis(hydroxymethyl)pentanoic acid, and 2,2-bis(hydroxymethyl)hexanoic acid; and (c) at least one polycarboxylic acid and/or a derivative thereof comprises at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

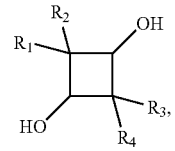

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) 2,2-bis(hydroxymethyl)propionic acid; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids.

In one embodiment, there is provided a polyester composition wherein the polyester comprises residues of:

(a) 2,2,4,4-tetramethylcyclobutane-1,3-diol;

(b) 2,2-bis(hydroxymethyl)propionic acid; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

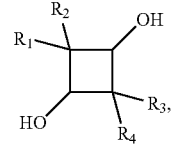

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) at least one BIS-MCA and/or a derivative thereof; and (c) at least one polycarboxylic acid and/or a derivative thereof; and (d) at least one additional hydroxyl component.

In one embodiment, there is provided a polyester composition wherein the polyester comprises residues of:

(a) 2,2,4,4-tetramethylcyclobutane-1,3-diol;

(b) at least one BIS-MCA and/or a derivative thereof; and (c) at least one polycarboxylic acid and/or a derivative thereof; and (d) at least one additional hydroxyl component.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

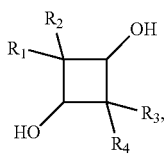

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) at least one BIS-MCA and/or a derivative thereof wherein the alkyl group of said BIS-MCA can be C1-C8, or in one embodiment, C1-C3 or in one embodiment, C1; and (c) at least one polycarboxylic acid and/or a derivative thereof; and (d) at least one additional hydroxyl component.

In one embodiment, there is provided a polyester composition wherein the polyester comprises residues of:

(a) 2,2,4,4-tetramethylcyclobutane-1,3-diol;

(b) at least one BIS-MCA and/or a derivative thereof wherein the alkyl group of said BIS-MCA can be C1-C8, or in one embodiment, C1-C3 or in one embodiment, C1; and (c) at least one polycarboxylic acid and/or a derivative thereof; and (d) at least one additional hydroxyl component.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

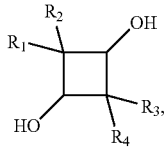

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) 2,2-bis(hydroxymethyl)propionic acid; and (c) at least one polycarboxylic acid and/or a derivative thereof; and (d) at least one additional hydroxyl component.

In one embodiment, there is provided a polyester composition wherein the polyester comprises residues of:

(a) 2,2,4,4-tetramethylcyclobutane-1,3-diol;

(b) 2,2-bis(hydroxymethyl)propionic acid; and (c) at least one polycarboxylic acid and/or a derivative thereof; and (d) at least one additional hydroxyl component.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

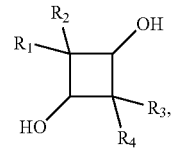

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) at least one BIS-MCA and/or a derivative thereof; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids; and (d) at least one additional hydroxyl component.

In one embodiment, there is provided a polyester composition wherein the polyester comprises residues of:

(a) 2,2,4,4-tetramethylcyclobutane-1,3-diol;

(b) at least one BIS-MCA and/or a derivative thereof; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids; and (d) at least one additional hydroxyl component.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

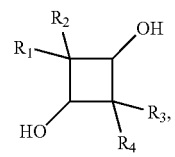

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) at least one BIS-MCA and/or a derivative thereof wherein the alkyl group of said BIS-MCA can be C1-C8, or in one embodiment, C1-C3 or in one embodiment, C1; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids; and (d) at least one additional hydroxyl component.

In one embodiment, there is provided a polyester composition wherein the polyester comprises residues of:

(a) 2,2,4,4-tetramethylcyclobutane-1,3-diol;

(b) at least one BIS-MCA and/or a derivative thereof wherein the alkyl group of said BIS-MCA can be C1-C8, or in one embodiment, C1-C3 or in one embodiment, C1; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids; and (d) at least one additional hydroxyl component.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

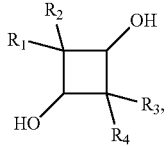

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) at least one 2,2-bis(hydroxymethyl)alkylcarboxylic acid and/or a derivative thereof selected from selected from at least one of 2,2-bis(hydroxymethyl)propionic acid, 2,2-bis(hydroxymethyl)butanoic acid, 2,2-bis(hydroxymethyl)pentanoic acid, and 2,2-bis(hydroxymethyl)hexanoic acid; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids; and (d) at least one additional hydroxyl component.

In one embodiment, there is provided a polyester composition wherein the polyester comprises residues of:

(a) 2,2,4,4-tetramethylcyclobutane-1,3-diol;

(b) at least one 2,2-bis(hydroxymethyl)alkylcarboxylic acid and/or a derivative thereof selected from selected from at least one of 2,2-bis(hydroxymethyl)propionic acid, 2,2-bis(hydroxymethyl)butanoic acid, 2,2-bis(hydroxymethyl)pentanoic acid, and 2,2-bis(hydroxymethyl)hexanoic acid; and (c) at least one polycarboxylic acid and/or a derivative thereof comprises at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids; and (d) at least one additional hydroxyl component.

In one embodiment, there is provided a polyester composition wherein the polyester comprises residues of:

(a) at least one cyclobutanediol, for example, a cyclobutanediol which is a 2,2,4,4-tetraalkylcyclobutane-1,3-diol defined by the following formula:

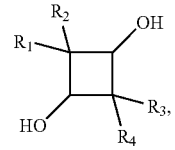

wherein $R_1$, $R_2$, $R_3$, and $R_4$ are each independently a $C_1$ to $C_8$ alkyl radical, wherein each of said alkyl radicals is selected from the group consisting of a linear alkyl radical, a branched alkyl radical, and a linear and branched alkyl radical;

(b) 2,2-bis(hydroxymethyl) propionic acid; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids; and (d) at least one additional hydroxyl component.

In one embodiment, there is provided a polyester composition wherein the polyester comprises residues of:

(a) 2,2,4,4-tetramethylcyclobutane-1,3-diol;

(b) 2,2-bis(hydroxymethyl)propionic acid; and (c) at least one polycarboxylic acid and/or a derivative thereof comprising at least one dialkyl ester of one or more dicarboxylic acids selected from naphthalenedicarboxylic, 1,2-cyclohexanedicarboxylic, 1,3-cyclohexanedicarboxylic, 1,4-cyclohexanedicarboxylic, phthalic, terephthalic, isophthalic, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids; and (d) at least one additional hydroxyl component.

In one embodiment, there is provided a curable polyester composition or formulation comprising at least one polyester which comprises:

(a) residues of at least one 2,2,4,4-tetraalkylcyclobutane-1,3-diol in an amount at least one of the following ranges: from about 1 to about 99 mole percent or from about 1 to about 95 mole percent or from about 5 to 95 mole percent or from about 5 to 50 mole percent or from about 10 to 40 mole percent or from about 10 to 30 mole percent or from about 60 to 99 mole percent or from about 30 to about 95 mole percent;

(b) residues of 2,2-dimethylolpropionic acid in an amount in the range of from about 1 to about 50 mole percent;

(c) optionally, residues of at least one additional polyhydroxyl component in an amount in the range of from 0 to 65 mole percent or from 0.01 to 65 mole percent; and (d) residues of at least one polycarboxylic acid and/or a derivative thereof, wherein the total moles of glycols in the polyester equal 100 mole %; and the total number of acids in the polyester equal 100 mole %; and wherein said polyester has an acid number in the range of from about 10 to about 100 mg KOH/g and a hydroxyl number in the range of from about 0.10 to about 200 mg KOH/g.

In one embodiment, this invention provides a curable polyester, comprising the residues of the following: (a) TACD; (b) DMPA; (c) optionally, a polyhydroxyl compound other than TACD and DMPA, and (d) a polycarboxylic acid compound, a derivative of polycarboxylic acid compound, or a combination thereof; wherein said curable polyester has an acid number from about 10 to about 100 mgKOH/g and a hydroxyl number ranging from 20 to about 200 mgKOH/g.

In one embodiment, this invention provides a polyester, comprising the residues of the following: (a) 2,2,4,4-tetramethyl-1,3-cyclobutanediol (TMCD); (b) DMPA; (c) optionally, a polyhydroxyl compound other than TMCD and DMPA; and (d) a polycarboxylic acid compound, a derivative of polycarboxylic acid compound, or a combination thereof; wherein said curable polyester has an acid number from about 10 to about 100 mgKOH/g and a hydroxyl number ranging from 20 to about 120 mgKOH/g.

In one embodiment, there is provided a curable polyester composition or formulation comprising at least one polyester which comprises:

(a) residues of at least one 2,2,4,4-tetraalkylcyclobutane-1,3-diol in an amount in the range of from about 30 to about 95 mole percent or from about 10 to about 40 mole percent;

(b) residues of 2,2-dimethylolpropionic acid in an amount in the range of from about 5 to about 30 mole percent, (c) optionally, residues of at least one additional polyhydroxyl component in an amount in the range of from 0 to 65 mole percent or from 0.01 to 65 mole percent, (d) residues of at least one polycarboxylic acid and/or a derivative thereof, wherein the total moles of glycols in the polyester equal 100 mole %; and the total number of acids in the polyester equal 100 mole %; and wherein said polyester has an acid number in the range of from about 10 to about 100 mg KOH/g and a hydroxyl number in the range of from about 20 to about 120 mg KOH/g.

In one embodiment, there is provided a coating composition or coating formulation comprising:

(a) at least one polyester comprising residues of—
(i) at least one 2,2,4,4-tetraalkylcyclobutane-1,3-diol;
(ii) 2,2-dimethylolpropionic acid; and
(iii) at least one polycarboxylic acid and/or a derivative thereof; and (b) at least one crosslinking agent and/or at least one neutralizing agent, or combinations of thereof, wherein, if present, said crosslinking agent is selected from the group consisting of amino resins, phenolic resins, isocyanate resins, epoxy resins, blocked isocyanate resins, 6-hydroxy alkylamides, and epoxidized phenolic resins.

Any of the polyesters in the compositions described herein can contain residues of at least one cyclobutanediol and in one embodiment, of at least one 2,2,4,4-tetraalkylcyclobutane-1,3-diol, and in another embodiment, of 2,2,4,4-tetramethylcyclobutane-1,3-diol, in an amount in the range of from about 1 to about 99 mole percent or about 1 to about 95 mole percent or about 5 to about 95 mole percent or about 10 to about 95 mole percent or about 15 to about 95 mole percent or about 20 to about 95 mole percent or about 25 to about 95 mole percent or about 30 to about 95 mole percent or about 35 to about 95 mole percent or about 40 to about 95 mole percent or about 45 to about 95 mole percent or about 50 to about 95 mole percent or about 55 to about 95 mole percent or about 60 to about 95 mole percent or about 65 to about 95 mole percent or about 70 to about 95 mole percent or about 75 to about 95 mole percent or about 80 to about 95 mole percent or about 85 to about 95 mole percent, or about 90 to about 95 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkylcyclobutane-1,3-diol, and in another embodiment, of 2,2,4,4-tetramethylcyclobutane-1,3-diol, in an amount in the range of from about 1 to about 90 mole percent or about 5 to about 90 mole percent or about 10 to about 90 mole percent or about 15 to about 90 mole percent or about 20 to about 90 mole percent or about 25 to about 90 mole percent or about 30 to about 90 mole percent or about 35 to about 90 mole percent or about 40 to about 90 mole percent or about 45 to about 90 mole percent or about 50 to about 90 mole percent or about 55 to about 90 mole percent or about 60 to about 90 mole percent or about 65 to about 90 mole percent or about 70 to about 90 mole percent or about 75 to about 90 mole percent or about 80 to about 90 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkylcyclobutane-1,3-diol, and in another embodiment, of 2,2,4,4-tetramethylcyclobutane-1,3-diol, in an amount in the range of from about 1 to about 85 mole percent or about 5 to about 85 mole percent or about 10 to about 85 mole percent or about 15 to about 85 mole percent or about 20 to about 85 mole percent or about 25 to about 85 mole percent or about 30 to about 85 mole percent or about 35 to about 85 mole percent or about 40 to about 85 mole percent or about 45 to about 85 mole percent or about or about 50 to about 85 mole percent or about 55 to about 85 mole percent or about 60 to about 85 mole percent or about 65 to about 85 mole percent or about 70 to about 85 mole percent or about 75 to about 85 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkylcyclobutane-1,3-diol, and in another embodiment, of 2,2,4,4-tetramethylcyclobutane-1,3-diol, in an amount in the range of from about 1 to about 80 mole percent or about 5 to about 80 mole percent or about 10 to about 80 mole percent or about 15 to about 80 mole percent or about 20 to about 80 mole percent or about 25 to about 80 mole percent or about 30 to about 80 mole percent or about 35 to about 80 mole percent or about 40 to about 80 mole percent or about 45 to about 80 mole percent or about 50 to about 80 mole percent or about 55 to about 80 mole percent or about 60 to about 80 mole percent or about 65 to about 80 mole percent or about 70 to about 80 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 75 mole percent or about 5 to about 75 mole percent or about 10 to about 75 mole percent or about 15 to about 75 mole percent or about 20 to about 75 mole percent or about 25 to about 75 mole percent or about 30 to about 75 mole percent or about 35 to about 75 mole percent or about 40 to about 75 mole percent or about 45 to about 75 mole percent or about 50 to about 75 mole percent or about 55 to about 75 mole percent or about 60 to about 75 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 70 mole percent or about 5 to about 70 mole percent or about 10 to about 70 mole percent or about 15 to about 70 mole percent or about 20 to about 70 mole percent or about 25 to about 70 mole percent or about 30 to about 70 mole percent or about 35 to about 70 mole percent or about 40 to about 70 mole percent or about 45 to about 70 mole percent or about 50 to about 70 mole percent or about 55 to about 70 mole percent or about 60 to about 70 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 65 mole percent or about 5 to about 65 mole percent or about 10 to about 65 mole percent or about 15 to about 65 mole percent or about 20 to about 65 mole percent or about 25 to about 65 mole percent or about 30 to about 65 mole percent or about 35 to about 65 mole percent or about 40 to about 65 mole percent or about 45 to about 65 mole percent or about 50 to about 65 mole percent or about 55 to about 65 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 60 mole percent or about 5 to about 60 mole percent or about 10 to about 60 mole percent or about 15 to about 60 mole percent or about 20 to about 60 mole percent or about 25 to about 60 mole percent or about 30 to about 60 mole percent or about 35 to about 60 mole percent or about 40 to about 60 mole percent or about 45 to about 60 mole percent or about 50 to about 60 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 55 mole percent or about 5 to about 55 mole percent or about 10 to about 55 mole percent or about 15 to about 55 mole percent or about 20 to about 55 mole percent or about 25 to about 55 mole percent or about 30 to about 55 mole percent or about 35 to about 55 mole percent or about 40 to about 55 mole percent or about 45 to about 55 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 45 mole percent or about 5 to about 45 mole percent or about 10 to about 45 mole percent or about 15 to about 45 mole percent or about 20 to about 45 mole percent or about 25 to about 45 mole percent or about 30 to about 45 mole percent or about 35 to about 45 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 40 mole percent or about 5 to about 40 mole percent or about 10 to about 40 mole percent or about 15 to about 40 mole percent or about 20 to about 40 mole percent or about 25 to about 40 mole percent or about 30 to about 40 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 35 mole percent or about 5 to about 35 mole percent or about 10 to about 35 mole percent or about 15 to about 35 mole percent or about 20 to about 35 mole percent or about 25 to about 35 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 30 mole percent or about 5 to about 30 mole percent or about 10 to about 30 mole percent or about 15 to about 30 mole percent or about 20 to about 30 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 25 mole percent about 5 to about 25 mole percent or about 10 to about 25 mole percent or about 15 to about 25 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 20 mole percent or about 5 to about 20 mole percent or about 10 to about 20 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 15 mole percent or about 5 to about 15 mole percent, based on the total mole percentage of glycols in the polyester equaling 100 mole percent.

Any of the polyesters in the compositions described herein can contain residues of at least one cyclobutanediol and in one embodiment, of at least one 2,2,4,4-tetraalkyl-cyclobutane-1,3-diol, and in another embodiment, of 2,2,4,4-tetramethylcyclobutane-1,3-diol, in an amount in the range of from about 1 to about 10 mole percent or about 5 to about 10 mole percent or about 1 to about 5 mole percent, based on the total mole percentage of glycols in the polyester equaling 100 mole percent.

Any of the polyesters in the compositions described herein can optionally contain at least one additional polyhydroxyl component in an amount in the range of from 0.01 to 99 mole percent, or from 0.01 to 95 mole percent, or from 0.01 to 90 mole percent, or from 0.01 to 85 mole percent, or from 0.01 to 80 mole percent, or from 0.01 to 75 mole percent, or from 0.01 to 70 mole percent, or from 0.01 to 65 mole percent, or from 0.01 to 60 mole percent, or from 0.01 to 55 mole percent, or from 0.01 to 50 mole percent, or from 0.01 to 45 mole percent, or from 0.01 to 40 mole percent, or from 0.01 to 35 mole percent, or from 0.01 to 30 mole percent, or from 0.01 to 25 mole percent, or from 0.01 to 20 mole percent, or from 0.01 to 15 mole percent, or from 0.01 to 10 mole percent, or from 0.01 to 5 mole percent, from 1 to 99 mole percent, or from 1 to 95 mole percent, or from 1 to 90 mole percent, or from 1 to 85 mole percent, or from 1 to 80 mole percent, or from 1 to 75 mole percent, or from 1 to 70 mole percent, or from 1 to 65 mole percent, or from 1 to 60 mole percent, or from 1 to 55 mole percent, or from 1 to 50 mole percent, or from 1 to 45 mole percent, or from 1 to 40 mole percent, or from 1 to 35 mole percent, or from 1 to 30 mole percent, or from 1 to 25 mole percent, or from 1 to 20 mole percent, or from 1 to 15 mole percent, or from 1 to 10 mole percent, or from 1 to 5 mole percent or from 5 to 95 mole percent, or from 5 to 90 mole percent, or from 5 to 85 mole percent, or from 5 to 80 mole percent, or from 5 to 75 mole percent, or from 5 to 70 mole percent, or from 5 to 65 mole percent, or from 5 to 60 mole percent, or from 5 to 55 mole percent, or from 5 to 50 mole percent, or from 5 to 45 mole percent, or from 5 to 40 mole percent, or from 5 to 35 mole percent, or from 5 to 30 mole percent, or from 5 to 25 mole percent, or from 5 to 20 mole percent, or from 5 to 15 mole percent, or from 5 to 10 mole percent, or from 10 to 95 mole percent, or from 10 to 90 mole percent, or from 10 to 85 mole percent, or from 10 to 80 mole percent, or from 10 to 75 mole percent, or from 10 to 70 mole percent, or from 10 to 65 mole percent, or from 10 to 60 mole percent, or from 10 to 55 mole percent, or from 10 to 50 mole percent, or from 10 to 45 mole percent, or from 10 to 40 mole percent, or from 10 to 35 mole percent, or from 10 to 30 mole percent, or from 10 to 25 mole percent, or from 10 to 20 mole percent, or from 10 to 15 mole percent, wherein the total mole percentage of glycols in the polyester equal 100 mole %; and the total mole percentage of acids in the polyester equal 100 mole %.

In one embodiment, any of the polyesters in the compositions described herein can optionally contain at least one additional polyhydroxyl component in an amount in the range of from 1 to 60 mole percent or from 1 to 50 mole percent, wherein the total mole percentage of glycols in the polyester equal 100 mole %; and the total mole percentage of acids in the polyester equal 100 mole %.

Any of the polyesters in the compositions described herein can contain at least one polyhydroxyl component which can be selected from 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, hydrogenated bisphenol A, ethylene glycol, propylene glycol, diethylene glycol, dipropylene glycol, triethylene glycol, tetraethylene glycol, polyethylene glycol, 1,1,1-trimethylol propane, 1,1,1-trimethylolethane, glycerin, pentaerythritol, erythritol, threitol, dipentaerythritol, sorbitol, or combinations thereof.

Any of the polyesters in the compositions described herein can contain an acid number in the range of from about 10 to about 100 mg KOH/g and a hydroxyl number in the range of from about 0.10 to about 200 mg KOH/g.

Any of the polyesters in the compositions described herein can contain an acid number in the range of from about 10 to about 100 mg KOH/g and a hydroxyl number in the range of from about 5 to about 200 mg KOH/g.

Any of the polyesters in the compositions described herein can contain an acid number in the range of from about 15 to about 200 mg KOH/g and a hydroxyl number in the range of from about 20 to about 100 mg KOH/g.

Any of the polyesters in the compositions described herein can contain an acid number in the range of from about 5 to about 100 mg KOH/g and a hydroxyl number in the range of from about 20 to about 100 mg KOH/g.

Any of the polyesters in the compositions described herein can contain an acid number in the range of from about 5 to about 75 mg KOH/g and a hydroxyl number in the range of from about 20 to about 100 mg KOH/g.

Any of the polyesters in the compositions described herein can contain an acid number in the range of from about 5 to about 50 mg KOH/g and a hydroxyl number in the range of from about 20 to about 100 mg KOH/g.

Any of the polyesters in the compositions described herein can contain a crosslinking agent.

Any of the polyesters in the compositions described herein can contain a crosslinking agent selected from the group consisting of amino resins, phenolic resins, isocyanate resins, epoxy resins, blocked isocyanate resins, β-hydroxy alkylamides, and epoxidized phenolic resins.

Any of the polyesters in the compositions described herein can have a number average molecular weight of from 500 to 10,000 or 500 to 9500 or 500 to 9000 or 500 to 8500 or 500 to 8000 or 500 to 7500 or 500 to 7000 or 500 to 6500 or 500 to 6000 or 500 to 5500 or 500 to 5000 or 500 to 4500 or 500 to 4000 or 500 to 3500 or 500 to 3000 or 500 to 2500 or 500 to 2000 or 500 to 1500 or 500 to 1000 or 750 to 10,000 or 750 to 9500 or 750 to 9000 or 750 to 8500 or 750 to 8000 or 750 to 7500 or 750 to 7000 or 750 to 6500 or 750 to 6000 or 750 to 5500 or 750 to 5000 or 750 to 4500 or 750 to 4000 or 750 to 3500 or 750 to 3000 or 750 to 2500 or 750 to 2000 or 750 to 1500 or 750 to 1000 or 1000 to 10,000 or 1000 to 9500 or 1000 to 9000 or 1000 to 8500 or 1000 to 8000 or 1000 to 7500 or 1000 to 7000 or 1000 to 6500 or 1000 to 6000 or 1000 to 5500 or 1000 to 5000 or 1000 to 4500 or 1000 to 4000 or 1000 to 3500 or 1000 to 3000 or 1000 to 2500 or 1000 to 2000 or 1000 to 1500.

Any of the polyesters in the compositions described herein can exclude sulfoisophthalic acid.

Any of the polyesters in the compositions described herein can contain an organic cosolvent.

Any of the polyesters in the compositions described herein can contain a neutralizing agent.

Any of the polyesters in the compositions described herein can be curable.

Any of the compositions described herein can be used in any one or more of coating compositions, paints, inks, or composites.

Any of the compositions described herein can be a waterborne coating composition.

Any of the compositions described herein can be a water-dispersible coating composition.

Any of the compositions described herein can be a water-dispersion.

Any of the compositions described herein can be a coating formulation.

Any of the compositions described herein can be a powder coating composition.

Any of the compositions described herein can be a solventborne coating composition.

The polyester composition of the invention can comprise a 2,2,4,4-tetraalkylcyclobutane-1,3-diol compound. Such a compound can be represented by the general structure:

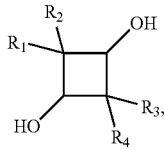

wherein R1, R2, R3, and R4 each independently represent an alkyl radical, for example, a lower alkyl radical having 1 to 8 carbon atoms. The alkyl radicals may be linear, branched, or a combination of linear and branched alkyl radicals.

The alkyl radicals R1, R2, R3, and R4 on the 2,2,4,4-tetraalkylcyclobutane-1,3-dione may each independently have 1 to 8 carbon atoms. 2,2,4,4-tetraalkylcyclobutane-1,3-diones that are suitably reduced to the corresponding diols include, but are not limited to, 2,2,4,4,-tetramethylcyclobutane-1,3-dione, 2,2,4,4-tetraethylcyclobutane-1,3-dione, 2,2,4,4-tetra-n-propylcyclobutane-1,3-dione, 2,2,4,4-tetra-n-butylcyclobutane-1,3-dione, 2,2,4,4-tetra-n-pentylcyclobutane-1,3-dione, 2,2,4,4-tetra-n-hexylcyclobutane-1,3-dione, 2,2,4,4-tetra-n-heptylcyclobutane-1,3-dione, 2,2,4,4-tetra-n-octylcyclobutane-1,3-dione, 2,2-bis(hydroxymethyl)dimethyl-4,4-diethylcyclobutane-1,3-dione, 2-ethyl-2,4,4-trimethylcyclobutane-1,3-dione, 2,4-dimethyl-2,4-diethylcyclobutane-1,3-dione, 2,4-dimethyl-2,4-di-n-propylcyclobutane-1,3-dione, 2,4-di-n-butyl-2,4-diethylcyclobutane-1,3-dione, 2,4-dimethyl-2,4-diisobutylcyclobutane-1,3-dione, and 2,4-diethyl-2,4-diisoamylcyclobutane-1,3-dione.

The corresponding 2,2,4,4-tetraalkylcyclobutane-1,3-diols that may be used as the TACD compound include 2,2,4,4-tetramethylcyclobutane-1,3-diol, 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-bis(hydroxymethyl)dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-di-n-butyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. In one embodiment, the TACD compound comprises 2,2,4,4-tetramethylcyclobutane-1,3-diol.

The alkyl radicals R1, R2, R3, and R4 on the 2,2,4,4-tetraalkylcyclobutane-1,3-diol may each independently have 1 to 6 carbon atoms, or 1 to 5 carbon atoms, or 1 to 4 carbon atoms, or 1 to 3 carbon atoms, or 1 to 2 carbon atoms. In another embodiment, the alkyl radicals R1, R2, R3, and R4 on the 2,2,4,4-tetraalkylcyclobutane-1,3-diol may each have 1 carbon atom.

Suitable additional polyhydroxyl compounds include compounds having at least two hydroxyl groups and are compounds other than TACD. Examples of such compounds include 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, hydrogenated bisphenol A, ethylene glycol, propylene glycol, diethylene glycol, dipropylene glycol, triethylene glycol, tetraethylene glycol, polyethylene glycol, 1,1,1-trimethylol propane, 1,1,1-trimethylolethane, glycerin, pentaerythritol, erythritol, threitol, dipentaerythritol, sorbitol, and the like.

In one embodiment, the polyhydroxyl compound comprises 2,2-dimethyl-1,3-propanediol (neopentyl glycol), 1,2 cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol, 1,1,1-trimethylol propane, 1,1,1-trimethylolethane, glycerin, and pentaerythritol. In another embodiment, the polyhydroxy compound is selected from the group consisting of 2,2-dimethyl-1,3-propanediol (neopentyl glycol or NPG), 1,3-cyclohexanedimethanol, 1,4 cyclohexanedimethanol, 2-methyl-1,3-propanediol, 1,1,1-trimethylol propane, 1,1,1-trimethylolethane, glycerin, and pentaerythritol. In one embodiment, the polyhydroxyl compound can be 1,4-cyclohexanedimethanol, neopentyl glycol, or 1,1,1-trimethylol propane or mixtures thereof. In one embodiment, the polyhydroxyl compound can be neopentyl glycol.

Suitable polycarboxylic acid compounds (d) include compounds having at least two carboxylic acid groups. In one aspect, the polycarboxylic acid compound comprises a dicarboxylic acid compound having two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride. In another aspect, the polycarboxylic acid compound comprises a tricarboxylic acid or anhydride, for example, trimellitic acid and trimellitic anhydride.

Examples of dicarboxylic acids that may be used include aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, hexahydrophthalic anhydride, tetrahydrophthalic anhydride, tetrachlorophthalic anhydride, trimellitic anhydride, dodecanedioic acid, sebacic acid, azelaic acid, maleic acid or anhydride, fumaric acid, succinic anhydride, succinic acid, adipic acid, 2,6-naphthalenedicarboxylic acid, glutaric acid, itatonic acid, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

Preferably, the polycarboxylic acid compound (d) comprises isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, adipic acid, 2,6-naphthalenedicarboxylic acid, 1,4-naphthalenedicarboxylic acid; 2,5-naphthalenedicarboxylic acid; hexahydrophthalic anhydride, tetrahydrophthalic anhydride, trimellitic anhydride, maleic acid or anhydride, fumaric acid, succinic anhydride, and succinic acid. Most preferably, the polycarboxylic acid compound (d) is selected from the group consisting of isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, adipic acid, hexahydrophthalic anhydride, trimellitic anhydride, maleic anhydride, and succinic anhydride.

The polyesters useful in this invention can have an acid number ranging from about 10 to about 100 mgKOH/g and a hydroxyl number ranging from about 0.10 to about 200 mgKOH/g; or an acid number ranging from about 10 to about 100 mgKOH/g and a hydroxyl number ranging from about 1 to about 200 mgKOH/g; or an acid number ranging from about 10 to about 100 mgKOH/g and a hydroxyl number ranging from about 5 to about 200 mgKOH/g; or an acid number ranging from about 10 to about 100 mgKOH/g and a hydroxyl number ranging from about 10 to about 200 mgKOH/g; or an acid number ranging from about 10 to about 100 mgKOH/g and a hydroxyl number ranging from about 15 to about 200 mgKOH/g; or an acid number ranging from about 10 to about 100 mgKOH/g and a hydroxyl number ranging from about 20 to about 200 mgKOH/g; or an acid number ranging from about 10 to about 100 mgKOH/g and a hydroxyl number ranging from about 25 to about 200 mgKOH/g; or an acid number ranging from about 10 to about 100 mgKOH/g and a hydroxyl number ranging from about 30 to about 200 mgKOH/g; or an acid number ranging from about 10 to about 100 mgKOH/g and a hydroxyl number ranging from about 40 to about 200 mgKOH/g; or an acid number ranging from about 10 to about 100 mgKOH/g and a hydroxyl number ranging from about 50 to about 200 mgKOH/g; or an acid number ranging from about 10 to about 100 mgKOH/g and a hydroxyl number ranging from about 60 to about 200 mgKOH/g; or an acid number ranging from about 10 to about 100 mgKOH/g and a hydroxyl number ranging from about 70 to about 200 mgKOH/g; or an acid number ranging from about 10 to about 100 mgKOH/g and a hydroxyl number ranging from about 80 to about 200 mgKOH/g; or an acid number ranging from about 10 to about 100 mgKOH/g and a hydroxyl number ranging from about 90 to about 200 mgKOH/g; or an acid number ranging from about 10 to about 100 mgKOH/g and a hydroxyl number ranging from about 100 to about 200 mgKOH/g; or an acid number ranging from about 10 to about 100 mgKOH/g and a hydroxyl number ranging from about 110 to about 200 mgKOH/g; or an acid number ranging from about 10 to about 100 mgKOH/g and a hydroxyl number ranging from about 120 to about 200 mgKOH/g; or an acid number ranging from about 10 to about 100 mgKOH/g and a hydroxyl number ranging from about 130 to about 200 mgKOH/g; or an acid number ranging from about 10 to about 100 mgKOH/g and a hydroxyl number ranging from about 140 to about 200 mgKOH/g; or an acid number ranging from about 10 to about 100 mgKOH/g and a hydroxyl number ranging from about 150 to about 200 mgKOH/g; or an acid number ranging from about 10 to about 100 mgKOH/g and a hydroxyl number ranging from about 0.10 to about 190 mgKOH/g; or an acid number ranging from about 10 to about 100 mgKOH/g and a hydroxyl number ranging from about 1 to about 190 mgKOH/g; or an acid number ranging from about 10 to about 100 mgKOH/g and a hydroxyl number ranging from about 5 to about 190 mgKOH/g; or an acid number ranging from about 10 to about 100 mgKOH/g and a hydroxyl number ranging from about 10 to about 190 mgKOH/g; or an acid number ranging from about 10 to about 100 mgKOH/g and a hydroxyl number ranging from about 15 to about 190 mgKOH/g; or an acid number ranging from about 10 to about 100 mgKOH/g and a hydroxyl number ranging from about 20 to about 190 mgKOH/g; or an acid number ranging from about 10 to about 100 mgKOH/g and a hydroxyl number ranging from about 25 to about 190 mgKOH/g; or an acid number ranging from about 10 to about 100 mgKOH/g and a hydroxyl number ranging from about 30 to about 190 mgKOH/g; or an acid number ranging from about 10 to about 100 mgKOH/g and a hydroxyl number ranging from about 40 to about 190 mgKOH/g; or an acid number ranging from about 10 to about 100 mgKOH/g and a hydroxyl number ranging from about 50 to about 190 mgKOH/g; or an acid number ranging from about 10 to about 100 mgKOH/g and a hydroxyl number ranging from about 60 to about 190 mgKOH/g; or an acid number ranging from about 10 to about 100 mgKOH/g and a hydroxyl number ranging from about 70 to about 190 mgKOH/g; or an acid number ranging from about 10 to about 100 mgKOH/g and a hydroxyl number ranging from about 80 to about 190 mgKOH/g; or an acid number ranging from about 10 to about 100 mgKOH/g and a hydroxyl number ranging from about 90 to about 190 mgKOH/g; or an acid number ranging from about 10 to about 100 mgKOH/g and a hydroxyl number ranging from about 100 to about 190 mgKOH/g; or an acid number ranging from about 10 to about 100 mgKOH/g and a hydroxyl number ranging from about 110 to about 190 mgKOH/g; or an acid number ranging from about 10 to about 100 mgKOH/g and a hydroxyl number ranging from about 120 to about 190 mgKOH/g; or an acid number ranging from about 10 to about 100 mgKOH/g and a hydroxyl number ranging from about 130 to about 190 mgKOH/g; or an acid number ranging from about 10 to about 100 mgKOH/g and a hydroxyl number ranging from about 140 to about 190 mgKOH/g; or an acid number ranging from about 10 to about 100 mgKOH/g and a hydroxyl number ranging from about 150 to about 190 mgKOH/g; or an acid number ranging from about 10 to about 100 mgKOH/g and a hydroxyl number ranging from about 0.10 to about 180 mgKOH/g; or an acid number ranging from about 10 to about 100 mgKOH/g and a hydroxyl number ranging from about 1 to about 180 mgKOH/g; or an acid number ranging from about 10 to about 100 mgKOH/g and a hydroxyl number ranging from about 5 to about 180 mgKOH/g; or an acid number ranging from about 10 to about 100 mgKOH/g and a hydroxyl number ranging from about 10 to about 180 mgKOH/g; or an acid number ranging from about 10 to about 100 mgKOH/g and a hydroxyl number ranging from about 15 to about 180 mgKOH/g; or an acid number ranging from about 10 to about 100 mgKOH/g and a hydroxyl number ranging from about 20 to about 180 mgKOH/g; or an acid number ranging from about 10 to about 100 mgKOH/g and a hydroxyl number ranging from about 25 to about 180 mgKOH/g; or an acid number ranging from about 10 to about 100 mgKOH/g and a hydroxyl number ranging from about 30 to about 180 mgKOH/g; or an acid number ranging from about 10 to about 100 mgKOH/g and a hydroxyl number ranging from about 40 to about 180 mgKOH/g; or an acid number ranging from about 10 to about 100 mgKOH/g and a hydroxyl number ranging from about 50 to about 180 mgKOH/g; or an acid number ranging from about 10 to about 100 mgKOH/g and a hydroxyl number ranging from about 60 to about 180 mgKOH/g; or an acid number ranging from about 10 to about 100 mgKOH/g and a hydroxyl number ranging from about 70 to about 180 mgKOH/g; or an acid number ranging from about 10 to about 100 mgKOH/g and a hydroxyl number ranging from about 80 to about 180 mgKOH/g; or an acid number ranging from about 10 to about 100 mgKOH/g and a hydroxyl number ranging from about 90 to about 180 mgKOH/g; or an acid number ranging from about 10 to about 100 mgKOH/g and a hydroxyl number ranging from about 100 to about 180 mgKOH/g; or an acid number ranging from about 10 to about 100 mgKOH/g and a hydroxyl number ranging from about 110 to about 180 mgKOH/g; or an acid number ranging from about 10 to about 100 mgKOH/g and a hydroxyl number ranging from about 120 to about 180 mgKOH/g; or an acid number ranging from about 10 to about 100 mgKOH/g and a hydroxyl number ranging from about 130 to about 180 mgKOH/g; or an acid number ranging from about 10 to about 100 mgKOH/g and a hydroxyl number ranging from about 140 to about 180 mgKOH/g; or an acid number ranging from about 10 to about 100 mgKOH/g and a hydroxyl number ranging from about 150 to about 180 mgKOH/g; or an acid number ranging from about 10 to about 100 mgKOH/g and a hydroxyl number ranging from about 0.10 to about 170 mgKOH/g; or an acid number ranging from about 10 to about 100 mgKOH/g and a hydroxyl number ranging from about 1 to about 170 mgKOH/g; or an acid number ranging from about 10 to about 100 mgKOH/g and a hydroxyl number ranging from about 5 to about 170 mgKOH/g; or an acid number ranging from about 10 to about 100 mgKOH/g and a hydroxyl number ranging from about 10 to about 170 mgKOH/g; or an acid number ranging from about 10 to about 100 mgKOH/g and a hydroxyl number ranging from about 15 to about 170 mgKOH/g; or an acid number ranging from about 10 to about 100 mgKOH/g and a hydroxyl number ranging from about 20 to about 170 mgKOH/g; or an acid number ranging from about 10 to about 100 mgKOH/g and a hydroxyl number ranging from about 25 to about 170 mgKOH/g; or an acid number ranging from about 10 to about 100 mgKOH/g and a hydroxyl number ranging from about 30 to about 170 mgKOH/g; or an acid number ranging from about 10 to about 100 mgKOH/g and a hydroxyl number ranging from about 40 to about 170 mgKOH/g; or an acid number ranging from about 10 to about 100 mgKOH/g and a hydroxyl number ranging from about 50 to about 170 mgKOH/g; or an acid number ranging from about 10 to about 100 mgKOH/g and a hydroxyl number ranging from about 60 to about 170 mgKOH/g; or an acid number ranging from about 10 to about 100 mgKOH/g and a hydroxyl number ranging from about 70 to about 170 mgKOH/g; or an acid number ranging from about 10 to about 100 mgKOH/g and a hydroxyl number ranging from about 80 to about 170 mgKOH/g; or an acid number ranging from about 10 to about 100 mgKOH/g and a hydroxyl number ranging from about 90 to about 170 mgKOH/g; or an acid number ranging from about 10 to about 100 mgKOH/g and a hydroxyl number ranging from about 100 to about 170 mgKOH/g; or an acid number ranging from about 10 to about 100 mgKOH/g and a hydroxyl number ranging from about 110 to about 170 mgKOH/g; or an acid number ranging from about 10 to about 100 mgKOH/g and a hydroxyl number ranging from about 120 to about 170 mgKOH/g; or an acid number ranging from about 10 to about 100 mgKOH/g and a hydroxyl number ranging from about 130 to about 170 mgKOH/g; or an acid number ranging from about 10 to about 100 mgKOH/g and a hydroxyl number ranging from about 140 to about 170 mgKOH/g; or an acid number ranging from about 10 to about 100 mgKOH/g and a hydroxyl number ranging from about 150 to about 170 mgKOH/g; or an acid number ranging from about 10 to about 100 mgKOH/g and a hydroxyl number ranging from about 0.10 to about 160 mgKOH/g; or an acid number ranging from about 10 to about 100 mgKOH/g and a hydroxyl number ranging from about 1 to about 160 mgKOH/g; or an acid number ranging from about 10 to about 100 mgKOH/g and a hydroxyl number ranging from about 5 to about 160 mgKOH/g; or an acid number ranging from about 10 to about 100 mgKOH/g and a hydroxyl number ranging from about 10 to about 160 mgKOH/g; or an acid number ranging from about 10 to about 100 mgKOH/g and a hydroxyl number ranging from about 15 to about 160 mgKOH/g; or an acid number ranging from about 10 to about 100 mgKOH/g and a hydroxyl number ranging from about 20 to about 160 mgKOH/g; or an acid number ranging from about 10 to about 100 mgKOH/g and a hydroxyl number ranging from about 25 to about 160 mgKOH/g; or an acid number ranging from about 10 to about 100 mgKOH/g and a hydroxyl number ranging from about 30 to about 160 mgKOH/g; or an acid number ranging from about 10 to about 100 mgKOH/g and a hydroxyl number ranging from about 40 to about 160 mgKOH/g; or an acid number ranging from about 10 to about 100 mgKOH/g and a hydroxyl number ranging from about 50 to about 160 mgKOH/g; or an acid number ranging from about 10 to about 100 mgKOH/g and a hydroxyl number ranging from about 60 to about 160 mgKOH/g; or an acid number ranging from about 10 to about 100 mgKOH/g and a hydroxyl number ranging from about 70 to about 160 mgKOH/g; or an acid number ranging from about 10 to about 100 mgKOH/g and a hydroxyl number ranging from about 80 to about 160 mgKOH/g; or an acid number ranging from about 10 to about 100 mgKOH/g and a hydroxyl number ranging from about 90 to about 160 mgKOH/g; or an acid number ranging from about 10 to about 100 mgKOH/g and a hydroxyl number ranging from about 100 to about 160 mgKOH/g; or an acid number ranging from about 10 to about 100 mgKOH/g and a hydroxyl number ranging from about 110 to about 160 mgKOH/g; or an acid number ranging from about 10 to about 100 mgKOH/g and a hydroxyl number ranging from about 120 to about 160 mgKOH/g; or an acid number ranging from about 10 to about 100 mgKOH/g and a hydroxyl number ranging from about 130 to about 160 mgKOH/g; or an acid number ranging from about 10 to about 100 mgKOH/g and a hydroxyl number ranging from about 140 to about 160 mgKOH/g; or an acid number ranging from about 10 to about 100 mgKOH/g and a hydroxyl number ranging from about 0.10 to about 150 mgKOH/g; or an acid number ranging from about 10 to about 100 mgKOH/g and a hydroxyl number ranging from about 1 to about 150 mgKOH/g; or an acid number ranging from about 10 to about 100 mgKOH/g and a hydroxyl number ranging from about 5 to about 150 mgKOH/g; or an acid number ranging from about 10 to about 100 mgKOH/g and a hydroxyl number ranging from about 10 to about 150 mgKOH/g; or an acid number ranging from about 10 to about 100 mgKOH/g and a hydroxyl number ranging from about 15 to about 150 mgKOH/g; or an acid number ranging from about 10 to about 100 mgKOH/g and a hydroxyl number ranging from about 20 to about 150 mgKOH/g; or an acid number ranging from about 10 to about 100 mgKOH/g and a hydroxyl number ranging from about 25 to about 150 mgKOH/g; or an acid number ranging from about 10 to about 100 mgKOH/g and a hydroxyl number ranging from about 30 to about 150 mgKOH/g; or an acid number ranging from about 10 to about 100 mgKOH/g and a hydroxyl number ranging from about 40 to about 150 mgKOH/g; or an acid number ranging from about 10 to about 100 mgKOH/g and a hydroxyl number ranging from about 50 to about 150 mgKOH/g; or an acid number ranging from about 10 to about 100 mgKOH/g and a hydroxyl number ranging from about 60 to about 150 mgKOH/g; or an acid number ranging from about 10 to about 100 mgKOH/g and a hydroxyl number ranging from about 70 to about 150 mgKOH/g; or an acid number ranging from about 10 to about 100 mgKOH/g and a hydroxyl number ranging from about 80 to about 150 mgKOH/g; or an acid number ranging from about 10 to about 100 mgKOH/g and a hydroxyl number ranging from about 90 to about 150 mgKOH/g; or an acid number ranging from about 10 to about 100 mgKOH/g and a hydroxyl number ranging from about 100 to about 150 mgKOH/g; or an acid number ranging from about 10 to about 100 mgKOH/g and a hydroxyl number ranging from about 110 to about 150 mgKOH/g; or an acid number ranging from about 10 to about 100 mgKOH/g and a hydroxyl number ranging from about 120 to about 150 mgKOH/g; or an acid number ranging from about 10 to about 100 mgKOH/g and a hydroxyl number ranging from about 130 to about 150 mgKOH/g; or an acid number ranging from about 10 to about 100 mgKOH/g and a hydroxyl number ranging from about 0.10 to about 140 mgKOH/g; or an acid number ranging from about 10 to about 100 mgKOH/g and a hydroxyl number ranging from about 1 to about 140 mgKOH/g; or an acid number ranging from about 10 to about 100 mgKOH/g and a hydroxyl number ranging from about 5 to about 140 mgKOH/g; or an acid number ranging from about 10 to about 100 mgKOH/g and a hydroxyl number ranging from about 10 to about 140 mgKOH/g; or an acid number ranging from about 10 to about 100 mgKOH/g and a hydroxyl number ranging from about 15 to about 140 mgKOH/g; or an acid number ranging from about 10 to about 100 mgKOH/g and a hydroxyl number ranging from about 20 to about 140 mgKOH/g; or an acid number ranging from about 10 to about 100 mgKOH/g and a hydroxyl number ranging from about 25 to about 140 mgKOH/g; or an acid number ranging from about 10 to about 100 mgKOH/g and a hydroxyl number ranging from about 30 to about 140 mgKOH/g; or an acid number ranging from about 10 to about 100 mgKOH/g and a hydroxyl number ranging from about 40 to about 140 mgKOH/g; or an acid number ranging from about 10 to about 100 mgKOH/g and a hydroxyl number ranging from about 50 to about 140 mgKOH/g; or an acid number ranging from about 10 to about 100 mgKOH/g and a hydroxyl number ranging from about 60 to about 140 mgKOH/g; or an acid number ranging from about 10 to about 100 mgKOH/g and a hydroxyl number ranging from about 70 to about 140 mgKOH/g; or an acid number ranging from about 10 to about 100 mgKOH/g and a hydroxyl number ranging from about 80 to about 140 mgKOH/g; or an acid number ranging from about 10 to about 100 mgKOH/g and a hydroxyl number ranging from about 90 to about 140 mgKOH/g; or an acid number ranging from about 10 to about 100 mgKOH/g and a hydroxyl number ranging from about 100 to about 140 mgKOH/g; or an acid number ranging from about 10 to about 100 mgKOH/g and a hydroxyl number ranging from about 110 to about 140 mgKOH/g; or an acid number ranging from about 10 to about 100 mgKOH/g and a hydroxyl number ranging from about 0.10 to about 130 mgKOH/g; or an acid number ranging from about 10 to about 100 mgKOH/g and a hydroxyl number ranging from about 1 to about 130 mgKOH/g; or an acid number ranging from about 10 to about 100 mgKOH/g and a hydroxyl number ranging from about 5 to about 130 mgKOH/g; or an acid number ranging from about 10 to about 100 mgKOH/g and a hydroxyl number ranging from about 10 to about 130 mgKOH/g; or an acid number ranging from about 10 to about 100 mgKOH/g and a hydroxyl number ranging from about 15 to about 130 mgKOH/g; or an acid number ranging from about 10 to about 100 mgKOH/g and a hydroxyl number ranging from about 20 to about 130 mgKOH/g; or an acid number ranging from about 10 to about 100 mgKOH/g and a hydroxyl number ranging from about 25 to about 130 mgKOH/g; or an acid number ranging from about 10 to about 100 mgKOH/g and a hydroxyl number ranging from about 30 to about 130 mgKOH/g; or an acid number ranging from about 10 to about 100 mgKOH/g and a hydroxyl number ranging from about 40 to about 130 mgKOH/g; or an acid number ranging from about 10 to about 100 mgKOH/g and a hydroxyl number ranging from about 50 to about 130 mgKOH/g; or an acid number ranging from about 10 to about 100 mgKOH/g and a hydroxyl number ranging from about 60 to about 130 mgKOH/g; or an acid number ranging from about 10 to about 100 mgKOH/g and a hydroxyl number ranging from about 70 to about 130 mgKOH/g; or an acid number ranging from about 10 to about 100 mgKOH/g and a hydroxyl number ranging from about 80 to about 130 mgKOH/g; or an acid number ranging from about 10 to about 100 mgKOH/g and a hydroxyl number ranging from about 90 to about 130 mgKOH/g; or an acid number ranging from about 10 to about 100 mgKOH/g and a hydroxyl number ranging from about 100 to about 130 mgKOH/g; or an acid number ranging from about 10 to about 100 mgKOH/g and a hydroxyl number ranging from about 110 to about 130 mgKOH/g; or an acid number ranging from about 10 to about 100 mgKOH/g and a hydroxyl number ranging from about 0.10 to about 120 mgKOH/g; or an acid number ranging from about 10 to about 100 mgKOH/g and a hydroxyl number ranging from about 1 to about 120 mgKOH/g; or an acid number ranging from about 10 to about 100 mgKOH/g and a hydroxyl number ranging from about 5 to about 120 mgKOH/g; or an acid number ranging from about 10 to about 100 mgKOH/g and a hydroxyl number ranging from about 10 to about 120 mgKOH/g; or an acid number ranging from about 10 to about 100 mgKOH/g and a hydroxyl number ranging from about 15 to about 120 mgKOH/g; or an acid number ranging from about 10 to about 100 mgKOH/g and a hydroxyl number ranging from about 20 to about 120 mgKOH/g; or an acid number ranging from about 10 to about 100 mgKOH/g and a hydroxyl number ranging from about 25 to about 120 mgKOH/g; or an acid number ranging from about 10 to about 100 mgKOH/g and a hydroxyl number ranging from about 30 to about 120 mgKOH/g; or an acid number ranging from about 10 to about 100 mgKOH/g and a hydroxyl number ranging from about 40 to about 120 mgKOH/g; or an acid number ranging from about 10 to about 100 mgKOH/g and a hydroxyl number ranging from about 50 to about 120 mgKOH/g; or an acid number ranging from about 10 to about 100 mgKOH/g and a hydroxyl number ranging from about 60 to about 120 mgKOH/g; or an acid number ranging from about 10 to about 100 mgKOH/g and a hydroxyl number ranging from about 70 to about 120 mgKOH/g; or an acid number ranging from about 10 to about 100 mgKOH/g and a hydroxyl number ranging from about 80 to about 120 mgKOH/g; or an acid number ranging from about 10 to about 100 mgKOH/g and a hydroxyl number ranging from about 90 to about 120 mgKOH/g; or an acid number ranging from about 10 to about 100 mgKOH/g and a hydroxyl number ranging from about 100 to about 120 mgKOH/g; or an acid number ranging from about 10 to about 100 mgKOH/g and a hydroxyl number ranging from about 0.10 to about 110 mgKOH/g; or an acid number ranging from about 10 to about 100 mgKOH/g and a hydroxyl number ranging from about 1 to about 110 mgKOH/g; or an acid number ranging from about 10 to about 100 mgKOH/g and a hydroxyl number ranging from about 5 to about 110 mgKOH/g; or an acid number ranging from about 10 to about 100 mgKOH/g and a hydroxyl number ranging from about 10 to about 110 mgKOH/g; or an acid number ranging from about 10 to about 100 mgKOH/g and a hydroxyl number ranging from about 15 to about 110 mgKOH/g; or an acid number ranging from about 10 to about 100 mgKOH/g and a hydroxyl number ranging from about 20 to about 120 mgKOH/g; or an acid number ranging from about 10 to about 100 mgKOH/g and a hydroxyl number ranging from about 25 to about 110 mgKOH/g; or an acid number ranging from about 10 to about 100 mgKOH/g and a hydroxyl number ranging from about 30 to about 110 mgKOH/g; or an acid number ranging from about 10 to about 100 mgKOH/g and a hydroxyl number ranging from about 40 to about 110 mgKOH/g; or an acid number ranging from about 10 to about 100 mgKOH/g and a hydroxyl number ranging from about 50 to about 110 mgKOH/g; or an acid number ranging from about 10 to about 100 mgKOH/g and a hydroxyl number ranging from about 60 to about 110 mgKOH/g; or an acid number ranging from about 10 to about 100 mgKOH/g and a hydroxyl number ranging from about 70 to about 110 mgKOH/g; or an acid number ranging from about 10 to about 100 mgKOH/g and a hydroxyl number ranging from about 80 to about 110 mgKOH/g; or an acid number ranging from about 10 to about 100 mgKOH/g and a hydroxyl number ranging from about 90 to about 110 mgKOH/g; or an acid number ranging from about 10 to about 100 mgKOH/g and a hydroxyl number ranging from about 100 to about 110 mgKOH/g; or an acid number ranging from about 10 to about 100 mgKOH/g and a hydroxyl number ranging from about 0.10 to about 100 mgKOH/g; or an acid number ranging from about 10 to about 100 mgKOH/g and a hydroxyl number ranging from about 1 to about 100 mgKOH/g; or an acid number ranging from about 10 to about 100 mgKOH/g and a hydroxyl number ranging from about 5 to about 100 mgKOH/g; or an acid number ranging from about 10 to about 100 mgKOH/g and a hydroxyl number ranging from about 10 to about 100 mgKOH/g; or an acid number ranging from about 10 to about 100 mgKOH/g and a hydroxyl number ranging from about 15 to about 100 mgKOH/g; or an acid number ranging from about 10 to about 100 mgKOH/g and a hydroxyl number ranging from about 20 to about 100 mgKOH/g; or an acid number ranging from about 10 to about 100 mgKOH/g and a hydroxyl number ranging from about 25 to about 100 mgKOH/g; or an acid number ranging from about 10 to about 100 mgKOH/g and a hydroxyl number ranging from about 30 to about 100 mgKOH/g; or an acid number ranging from about 10 to about 100 mgKOH/g and a hydroxyl number ranging from about 40 to about 100 mgKOH/g; or an acid number ranging from about 10 to about 100 mgKOH/g and a hydroxyl number ranging from about 50 to about 100 mgKOH/g; or an acid number ranging from about 10 to about 100 mgKOH/g and a hydroxyl number ranging from about 60 to about 100 mgKOH/g; or an acid number ranging from about 10 to about 100 mgKOH/g and a hydroxyl number ranging from about 70 to about 100 mgKOH/g; or an acid number ranging from about 10 to about 100 mgKOH/g and a hydroxyl number ranging from about 80 to about 100 mgKOH/g; or an acid number ranging from about 10 to about 100 mgKOH/g and a hydroxyl number ranging from about 0.10 to about 90 mgKOH/g; or an acid number ranging from about 10 to about 100 mgKOH/g and a hydroxyl number ranging from about 1 to about 90 mgKOH/g; or an acid number ranging from about 10 to about 100 mgKOH/g and a hydroxyl number ranging from about 5 to about 90 mgKOH/g; or an acid number ranging from about 10 to about 100 mgKOH/g and a hydroxyl number ranging from about 10 to about 90 mgKOH/g; or an acid number ranging from about 10 to about 100 mgKOH/g and a hydroxyl number ranging from about 15 to about 90 mgKOH/g; or an acid number ranging from about 10 to about 100 mgKOH/g and a hydroxyl number ranging from about 20 to about 90 mgKOH/g; or an acid number ranging from about 10 to about 100 mgKOH/g and a hydroxyl number ranging from about 25 to about 90 mgKOH/g; or an acid number ranging from about 10 to about 100 mgKOH/g and a hydroxyl number ranging from about 30 to about 90 mgKOH/g; or an acid number ranging from about 10 to about 100 mgKOH/g and a hydroxyl number ranging from about 40 to about 90 mgKOH/g; or an acid number ranging from about 10 to about 100 mgKOH/g and a hydroxyl number ranging from about 50 to about 90 mgKOH/g; or an acid number ranging from about 10 to about 100 mgKOH/g and a hydroxyl number ranging from about 60 to about 90 mgKOH/g; or an acid number ranging from about 10 to about 100 mgKOH/g and a hydroxyl number ranging from about 70 to about 90 mgKOH/g; or an acid number ranging from about 10 to about 100 mgKOH/g and a hydroxyl number ranging from about 0.10 to about 80 mgKOH/g; or an acid number ranging from about 10 to about 80 mgKOH/g and a hydroxyl number ranging from about 1 to about 80 mgKOH/g; or an acid number ranging from about 10 to about 100 mgKOH/g and a hydroxyl number ranging from about 5 to about 80 mgKOH/g; or an acid number ranging from about 10 to about 100 mgKOH/g and a hydroxyl number ranging from about 10 to about 80 mgKOH/g; or an acid number ranging from about 10 to about 100 mgKOH/g and a hydroxyl number ranging from about 15 to about 80 mgKOH/g; or an acid number ranging from about 10 to about 100 mgKOH/g and a hydroxyl number ranging from about 20 to about 80 mgKOH/g; or an acid number ranging from about 10 to about 100 mgKOH/g and a hydroxyl number ranging from about 25 to about 80 mgKOH/g; or an acid number ranging from about 10 to about 100 mgKOH/g and a hydroxyl number ranging from about 30 to about 80 mgKOH/g; or an acid number ranging from about 10 to about 100 mgKOH/g and a hydroxyl number ranging from about 40 to about 80 mgKOH/g; or an acid number ranging from about 10 to about 100 mgKOH/g and a hydroxyl number ranging from about 50 to about 80 mgKOH/g; or an acid number ranging from about 10 to about 100 mgKOH/g and a hydroxyl number ranging from about 60 to about 80 mgKOH/g; or an acid number ranging from about 10 to about 100 mgKOH/g and a hydroxyl number ranging from about 0.10 to about 70 mgKOH/g; or an acid number ranging from about 10 to about 100 mgKOH/g and a hydroxyl number ranging from about 1 to about 70 mgKOH/g; or an acid number ranging from about 10 to about 100 mgKOH/g and a hydroxyl number ranging from about 5 to about 70 mgKOH/g; or an acid number ranging from about 10 to about 100 mgKOH/g and a hydroxyl number ranging from about 10 to about 70 mgKOH/g; or an acid number ranging from about 10 to about 100 mgKOH/g and a hydroxyl number ranging from about 15 to about 70 mgKOH/g; or an acid number ranging from about 10 to about 100 mgKOH/g and a hydroxyl number ranging from about 20 to about 70 mgKOH/g; or an acid number ranging from about 10 to about 100 mgKOH/g and a hydroxyl number ranging from about 25 to about 70 mgKOH/g; or an acid number ranging from about 10 to about 100 mgKOH/g and a hydroxyl number ranging from about 30 to about 70 mgKOH/g; or an acid number ranging from about 10 to about 100 mgKOH/g and a hydroxyl number ranging from about 40 to about 70 mgKOH/g; or an acid number ranging from about 10 to about 100 mgKOH/g and a hydroxyl number ranging from about 50 to about 70 mgKOH/g; or an acid number ranging from about 10 to about 100 mgKOH/g and a hydroxyl number ranging from about 60 to about 70 mgKOH/g; or an acid number ranging from about 10 to about 100 mgKOH/g and a hydroxyl number ranging from about 0.10 to about 60 mgKOH/g; or an acid number ranging from about 10 to about 100 mgKOH/g and a hydroxyl number ranging from about 1 to about 60 mgKOH/g; or an acid number ranging from about 10 to about 100 mgKOH/g and a hydroxyl number ranging from about 5 to about 60 mgKOH/g; or an acid number ranging from about 10 to about 100 mgKOH/g and a hydroxyl number ranging from about 10 to about 60 mgKOH/g; or an acid number ranging from about 10 to about 100 mgKOH/g and a hydroxyl number ranging from about 15 to about 60 mgKOH/g; or an acid number ranging from about 10 to about 100 mgKOH/g and a hydroxyl number ranging from about 20 to about 60 mgKOH/g; or an acid number ranging from about 10 to about 100 mgKOH/g and a hydroxyl number ranging from about 25 to about 60 mgKOH/g; or an acid number ranging from about 10 to about 100 mgKOH/g and a hydroxyl number ranging from about 30 to about 60 mgKOH/g; or an acid number ranging from about 10 to about 100 mgKOH/g and a hydroxyl number ranging from about 40 to about 60 mgKOH/g; or an acid number ranging from about 10 to about 100 mgKOH/g and a hydroxyl number ranging from about 50 to about 60 mgKOH/g; or an acid number ranging from about 10 to about 100 mgKOH/g and a hydroxyl number ranging from about 0.10 to about 50 mgKOH/g; or an acid number ranging from about 10 to about 100 mgKOH/g and a hydroxyl number ranging from about 1 to about 50 mgKOH/g; or an acid number ranging from about 10 to about 100 mgKOH/g and a hydroxyl number ranging from about 5 to about 50 mgKOH/g; or an acid number ranging from about 10 to about 100 mgKOH/g and a hydroxyl number ranging from about 10 to about 50 mgKOH/g; or an acid number ranging from about 10 to about 100 mgKOH/g and a hydroxyl number ranging from about 15 to about 50 mgKOH/g; or an acid number ranging from about 10 to about 100 mgKOH/g and a hydroxyl number ranging from about 20 to about 50 mgKOH/g; or an acid number ranging from about 10 to about 100 mgKOH/g and a hydroxyl number ranging from about 25 to about 50 mgKOH/g; or an acid number ranging from about 10 to about 100 mgKOH/g and a hydroxyl number ranging from about 30 to about 50 mgKOH/g; or an acid number ranging from about 10 to about 100 mgKOH/g and a hydroxyl number ranging from about 40 to about 50 mgKOH/g; or an acid number ranging from about 10 to about 100 mgKOH/g and a hydroxyl number ranging from about 0.10 to about 40 mgKOH/g; or an acid number ranging from about 10 to about 100 mgKOH/g and a hydroxyl number ranging from about 1 to about 40 mgKOH/g; or an acid number ranging from about 10 to about 100 mgKOH/g and a hydroxyl number ranging from about 5 to about 40 mgKOH/g; or an acid number ranging from about 10 to about 100 mgKOH/g and a hydroxyl number ranging from about 10 to about 40 mgKOH/g; or an acid number ranging from about 10 to about 100 mgKOH/g and a hydroxyl number ranging from about 15 to about 40 mgKOH/g; or an acid number ranging from about 10 to about 100 mgKOH/g and a hydroxyl number ranging from about 20 to about 40 mgKOH/g; or an acid number ranging from about 10 to about 100 mgKOH/g and a hydroxyl number ranging from about 25 to about 40 mgKOH/g; or an acid number ranging from about 10 to about 100 mgKOH/g and a hydroxyl number ranging from about 30 to about 40 mgKOH/g; or an acid number ranging from about 10 to about 100 mgKOH/g and a hydroxyl number ranging from about 0.10 to about 30 mgKOH/g; or an acid number ranging from about 10 to about 100 mgKOH/g and a hydroxyl number ranging from about 1 to about 30 mgKOH/g; or an acid number ranging from about 10 to about 100 mgKOH/g and a hydroxyl number ranging from about 5 to about 30 mgKOH/g; or an acid number ranging from about 10 to about 100 mgKOH/g and a hydroxyl number ranging from about 10 to about 30 mgKOH/g; or an acid number ranging from about 10 to about 100 mgKOH/g and a hydroxyl number ranging from about 15 to about 30 mgKOH/g; or an acid number ranging from about 10 to about 100 mgKOH/g and a hydroxyl number ranging from about 20 to about 30 mgKOH/g; or an acid number ranging from about 10 to about 100 mgKOH/g and a hydroxyl number ranging from about 0.10 to about 20 mgKOH/g; or an acid number ranging from about 10 to about 100 mgKOH/g and a hydroxyl number ranging from about 1 to about 20 mgKOH/g; or an acid number ranging from about 10 to about 100 mgKOH/g and a hydroxyl number ranging from about 5 to about 20 mgKOH/g; or an acid number ranging from about 10 to about 100 mgKOH/g and a hydroxyl number ranging from about 10 to about 20 mgKOH/g; or an acid number ranging from about 10 to about 100 mgKOH/g and a hydroxyl number ranging from about 0.10 to about 10 mgKOH/g; or an acid number ranging from about 10 to about 100 mgKOH/g and a hydroxyl number ranging from about 1 to about 10 mgKOH/g. In some embodiments, all the above described ranges for hydroxyl numbers can be combined with ranges for the acid number as follows: 10 to 90 or 10 to 80 or 10 to 60 or 10 to 50 or 10 to 45 or 10 to 40 or 10 to 35 or 10 to 30 or 10 to 25 or 10 to 20 or 15 to 90 or 15 to 80 or 15 to 60 or 15 to 50 or 15 to 45 or 15 to 40 or 15 to 35 or 15 to 30 or 15 to 25 or 20 to 90 or 20 to 80 or 20 to 60 or 20 to 50 or 20 to 45 or 20 to 40 or 20 to 35 or 20 to 30 or 25 to 90 or 25 to 80 or 25 to 60 or 25 to 50 or 25 to 45 or 25 to 40 or 25 to 35 or 30 to 90 or 30 to 80 or 30 to 60 or 30 to 50 or 30 to 45 or 30 to 40 or 35 to 90 or 35 to 80 or 35 to 60 or 35 to 50 or 35 to 45 or 40 to 90 or 40 to 80 or 40 to 60 or 40 to 50 or 45 to 90 or 45 to 80 or 45 to 60 or 50 to 90 or 50 to 80 or 50 to 60 or 55 to 90 or 55 to 80 or 60 to 90 or 60 to 80 or 60 to 70 or 70 to 90 or 70 to 80 or 80 to 90.

The acid number and hydroxyl number can vary depending on the application. For example, though the acid number for waterborne coatings is not intended to be limiting by the following, the acid number for waterborne coating applications can be about 10 to about 100 to impart sufficient water dispersibility after neutralization. Although not intended to be limiting, the acid number for solvent-based coating application can be about 20 to about 50 for better solubility and lower solution viscosity. Although not intending to be limiting, the hydroxyl number can be about 40 to about 100 for crosslinking with hydroxyl-active crosslinkers such as, for example, amino resin (or aminoplast) and isocyanate resin. Although not intending to be limiting, for dual crosslinking systems, for example, a coating formulation containing both amino and epoxy crosslinkers, the hydroxyl number can be 20 to 80 or 30 to 80 or 30 to 75 and acid number can be 10 to 50 or 20 to 50.

The glass transition temperature (Tg) of the curable polyester of the present invention can be from −50° C. to 150° C., from −50° C. to 135° C., from −50° C. to 120° C., from 10° C. to 110° C., from 20° C. to 105° C., from 30° C. to 100° C., from 40° C. to 95° C., or from 50° C. to 90° C.

The weight average molecular weight (Mw) of the polyester of the present invention may be from 1,000 to 100,000; or from 1,000 to 50,000 or from 1,000 to 45,000 or from 1,000 to 40,000 or from 1,000 to 35,000 or from 1,000 to 30,000; or from 1000 to 20,000; or from 1000 to 15,000 or from 1,000 to 10,000 or from 2,000 to 100,000; or from 2,000 to 50,000 or from 2,000 to 45,000 or from 2,000 to 40,000 or from 2,000 to 35,000 or from 2,000 to 30,000; or from 2000 to 20,000; or from 2000 to 15,000 or from 2,000 to 10,000; or from 3,000 to 100,000; or from 3,000 to 50,000 or from 3,000 to 45,000 or from 3,000 to 40,000 or from 3,000 to 35,000 or from 3,000 to 30,000; or from 3000 to 20,000; or from 3000 to 15,000 or from 3,000 to 10,000 or from 4,000 to 100,000; or from 4,000 to 50,000 or from 4,000 to 45,000 or from 4,000 to 40,000 or from 4,000 to 35,000 or from 4,000 to 30,000; or from 4000 to 20,000; or from 4000 to 15,000 or from 4,000 to 10,000 g/mole or from 5,000 to 100,000; or from 5,000 to 50,000 or from 5,000 to 45,000 or from 5,000 to 40,000 or from 5,000 to 35,000 or from 5,000 to 30,000; or from 5000 to 20,000; or from 5000 to 15,000 or from 5,000 to 10,000 g/mole.

The number average molecular weight (Mn) of the polyester of the present invention may be from 1,000 to 15,000 or from 1,000 to 10,000; or from 1,000 to 9,000; or from 1,000 to 8,000; or from 1,000 to 7,000; or from 1000 to 6,000 or from 1,000 to 5,000; or from 1,500 to 4,500; or from 2,000 to 15,000 or from 2,000 to 10,000; or from 2,000 to 9,000; or from 2,000 to 8,000; or from 2,000 to 7,000; or from 2000 to 6,000 or from 2,000 to 5,000; or from 3,000 to 15,000; 3,000 to 10,000; or from 3,000 to 9,000; or from 3,000 to 8,000; or from 3,000 to 7,000; or from 3000 to 6,000 or from 3,000 to 5,000.

In another embodiment, there is provided a curable polyester comprising the residues of:

a) 2,2,4,4-tetraalkylcyclobutane-1,3-diol (TACD) in an amount ranging from about 30 to 95 mole %, based on the total moles of (a), (b), and (c), b) 2,2-bis(hydroxymethyl)propionic acid (DMPA) in an amount ranging from about 5 to 30 mole %, based on the total moles of (a), (b), and (c), c) optionally, at least one polyhydroxyl compound other than TACD and DMPA in an amount ranging from about 0 to 65 mole %, based on the total moles of (a), (b), and (c), d) at least one polycarboxylic acid compound, a derivative of polycarboxylic acid compound, or a combination thereof, wherein said curable polyester has an acid number ranging from about 10 to about 100 mgKOH/g and a hydroxyl number ranging from 20 to about 120 mgKOH/g.

In the above polyester, the polyhydroxyl compound (c) can be selected from the group consisting of 2,2-dimethyl-1,3-propanediol (neopentyl glycol), 1,3-cyclohexanedimethanol, 1,4-cyclohexanedimethanol, 2-methyl-1,3-propanediol, 1,1,1-trimethylol propane, 1,1,1-trimethylolethane, and pentaerythritol; the polycarboxylic acid (d) is selected from the group consisting of isophthalic acid (or dimethyl isophthalate), terephthalic acid (or dimethyl terephthalate), 1,4-cyclohexanedicarboxylic acid, 1,3-cyclohexanedicarboxylic acid, and adipic acid.

In one embodiment, the 2,2,4,4-tetraalkylcyclobutane-1,3-diol (TACD) (a) comprises 2,2,4,4-tetramethylcyclobutane-1,3-diol (TMCD).

In yet another embodiment, there is provided a curable polyester comprising the residues of:

a) 2,2,4,4-tetraalkylcyclobutane-1,3-diol (TACD) in an amount ranging from about 50 to 95 mole %, based on the total moles of (a), (b), and (c), b) 2,2-bis(hydroxymethyl)propionic acid (DMPA) in an amount ranging from about 5 to 30 mole %, based on the total moles of (a), (b), and (c), c) optionally, at least one polyhydroxyl compound other than TACD and DMPA in an amount ranging from about 0 to 45 mole %, based on the total moles of (a), (b), and (c), d) at least one polycarboxylic acid compound, a derivative of polycarboxylic acid compound, or a combination thereof, wherein said polyester has an acid number ranging from about 10 to about 100 mgKOH/g and a hydroxyl number ranging from 20 to about 120 mgKOH/g. In one embodiment, the polyester can be curable.

In a further embodiment, there is provided a curable polyester comprising the residues of:

a) 2,2,4,4-tetraalkylcyclobutane-1,3-diol (TACD) in an amount ranging from about 70 to 90 mole %, based on the total moles of (a), (b), and (c), b) 2,2-bis(hydroxymethyl)propionic acid (DMPA) in an amount ranging from about 10 to 30 mole %, based on the total moles of (a), (b), and (c), c) optionally, at least one polyhydroxyl compound other than TACD and DMPA in an amount ranging from about 0 to 20 mole %, based on the total moles of (a), (b), and (c), d) d) at least one polycarboxylic acid compound, a derivative of polycarboxylic acid compound, or a combination thereof, wherein said curable polyester has an acid number ranging from about 10 to about 100 mgKOH/g and a hydroxyl number ranging from 20 to about 120 mgKOH/g.

In another aspect, this invention provides a solvent-based coating composition, comprising:

a) a polyester of the present invention, b) at least one crosslinker selected from the group comprising amino resin, phenolic resin, isocyanate resin, β-hydroxy alkylamides, and epoxy resin, and c) at least one organic solvent.

Suitable organic solvents for the solvent-based coating composition include xylene, ketones (for example, methyl amyl ketone), 2-butoxyethanol, ethyl-3-ethoxypropionate, toluene, butanol, cyclopentanone, cyclohexanone, ethyl acetate, butyl acetate, and other volatile inert solvents typically used in industrial baking (i.e., thermosetting) enamels.

In yet another aspect, this invention further provides an aqueous dispersion, comprising:

a) at least one polyester of the present invention, b) at least one neutralizing agent, and c) water.

The neutralizing agent may be an amine or an inorganic base. Typical amines include ammonia, trimethylamine, diethylamine, monoethanolamine, monoisopropanolamine, morpholine, ethanolamine, diethanolamine, triethanolamine, 2-amino-2-methyl-1-propanol, N,N-dimethylethanolamine, N, N-diethylethanolamine, N-methyldiethanolamine and the like.

Typical inorganic bases include bases derived from alkali metals and alkaline earth metals such as, for example, sodium, potassium, magnesium, calcium, and other basic metal compounds. Suitable bases from this first class of bases useful in the present invention include, but are not limited to, sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, and sodium pyrophosphate.

The aqueous dispersion of this invention may further comprise an organic co-solvent. Suitable co-solvents include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents.

As a further aspect, this invention provides a waterborne coating composition, comprising:

a) the polyester of the present invention, which has an acid number from about 10 to about 100 mgkOH/g, b) at least one neutralizing agent, c) water, and d) at least one crosslinker selected from the group comprising amino resin, phenolic resin, isocyanate resin, β-hydroxy alkylamides and epoxy resin.

In one embodiment, curable polyester resins can have a glass transition temperature (Tg) greater than about 50° C. are suitable for powder coating applications. The polyester of the present invention comprises TACD, which is capable of providing glass transition temperatures (Tgs) greater than 50° C.

In a further embodiment, this invention provides a powder coating composition, comprising a polyester of the present invention, which has Tg greater than about 50° C. and a crosslinker selected from the group comprising amino resin, blocked isocyanate resin, phenolic resin, β-hydroxy alkylamides, epoxy resin, and epoxidized phenolic resin.

The amino resin crosslinker (or cross-linking agent) can be a melamine-formaldehyde type cross-linking agent, i.e., a cross-linking agent having a plurality of —N(CH2OR3)2 functional groups, wherein R3 is C1-C4 alkyl, in one embodiment, methyl.

The cross-linking agent may also be a modified melamine-formaldehyde type resin such as toluene sulfonamide modified melamine-formaldehyde resins, and the like.

In general, the cross-linking agent may be selected from compounds of the following formulae, wherein R3 is independently C1-C4 alkyl:

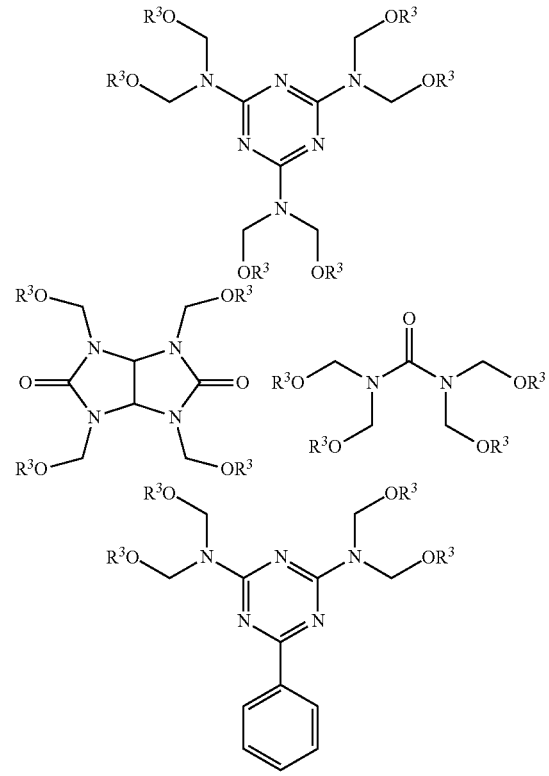

In this regard, preferred cross-linking agents include hexamethoxymethylmelamine, tetramethoxymethylbenzoguanamine, tetramethoxymethylurea, mixed butoxy/methoxy substituted melamines, and the like. The most preferred cross-linking agent is hexamethoxymethylmelamine. Alternatively, a toluene sulfonamide methylated melaminformaldehyde resin powder may be utilized as a cross-linking agent.

This disclosure can include one or more crosslinking agents.

The crosslinking agent may also be blocked or non-blocked isocyanate type. Examples of suitable isocyanate crosslinking agents include, but are not limited to, 1,6-hexamethylene diisocyanate, methylene bis(4-cyclohexyl isocyanate), isophorone diisocyanate, 2,4-toluene diisocyanate, and Bayhydur® 302 (BAYER MaterialScience).

The crosslinking agent may also be phenolic resin type. Examples of suitable phenolic crosslinking agents include the condensation products of phenols with aldehydes such as formaldehyde and acetaldehyde. Various phenols can be used such as phenol, cresol, p-alkylphenol, p-phenylphenol, and resorcinol. The phenolic resin may be resole or novolac type. Examples of suitable commercial phenolic resins include PHENODUR® PR 516/60B, PHENODUR® PR 371/70B, and PHENODUR® PR 612/80B available from Allnex; those with DUREZ® or VARCUM® trade names available from Durex Corp.; and those with Bakelite® trade name available from MOMENTIVE.

The crosslinking agent many also be epoxidized phenolic resin type. An example is the reaction product of epichlorohydrin and phenol-formaldehyde novolac such as D.E.N.-431, -438, -439, or D.E.R. 354 available from Dow Chemical Company.

In the case of thermosetting powder coating compositions, cross-linking agents can include cross-linking compounds with epoxy groups such as triglycidyl isocyanurate. Certain epoxy functional compounds generally have a molecular weight of about 300 to about 4000, and have approximately 0.05 to about 0.99 epoxy groups per 100 g of resin (i.e., 100-2000 weight per epoxy (WPE)). Such resins are widely known and are commercially-available under EPON™ trade name available from MOMENTIVE.

In another aspect, this invention further provides a coating composition further comprising one or more cross-linking catalysts. Examples of such catalysts include p-toluenesulfonic acid, the NACURE™ 155, 5076, and 1051 catalysts sold by King Industries, BYK 450, 470, available from BYK-Chemie U.S.A., methyl tolyl sulfonimide, and the like.

The polydispersity index (PDI) or heterogeneity index as used in this disclosure is a measure of the distribution of molecular mass in a given polymer sample. The PDI calculated herein is the weight average molecular weight (Mw) divided by the number average molecular weight (Mn). In one embodiment of the disclosure, the PDI can include but not be limited to one of the following ranges: 5 or less; or 4 or less; or 3 or less; or from 1 to 5; or from 1 to 4.5; or from 1 to 4; or from 1 to 3.5; or from 1 to 3; or from 1 to 2.5; or from 1 to 2; or from 2 to 5; or from 2 to 4; or from 2 to 3; from 3 to 5; or from 3 to 4; or from 2.5 to 5; or from 2.5 to 4.5; or from 2.5 to 4; or from 2.5 to 3.5.

As a further aspect of the present invention, there is provided a coating composition as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; antioxidants, fillers, corrosion inhibitors; thickening agents; or coalescing agents.

Specific examples of such additives can be found in Raw Materials Index, published by the National Paint & Coatings Association, 1500 Rhode Island Avenue, N.W., Washington, D.C. 20005.

Examples of antioxidants that can be useful in the invention include but are not limited to phosphorus compounds including phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl. In one embodiment, the number of ester groups present in the particular phosphorous compound can vary from zero up to the maximum allowable based on the number of hydroxyl groups present on the phosphorus compound used. Examples of such phosphorus compounds include but are not limited to substituted or unsubstituted alkyl phosphate esters, substituted or unsubstituted aryl phosphate esters, substituted or unsubstituted mixed alkyl aryl phosphate esters, phosphites, diphosphites, aryl phosphites, alkyl phosphites, salts of phosphoric acid, phosphine oxides, and mixed aryl alkyl phosphites, reaction products thereof, and mixtures thereof.

This polyester can be useful in several areas including but not limited to thermoplastic polyester applications, composites, curable polyester applications, such as coating compositions including but not limited to waterborne coatings, water-dispersible coatings, solvent-borne coatings, powder coatings, paints and inks.

The following examples are given to illustrate the invention and to enable any person skilled in the art to make and use the invention. It should be understood, however, that the invention is not to be limited to the specific conditions or details described in these examples. The patentable scope of the invention is defined by the claims, and may include other examples that occur to those skilled in the art.

EXAMPLES

The following examples further illustrate how the compositions of the invention can be made and evaluated, and are intended to be purely exemplary of the invention and are not intended to limit the scope thereof. Unless indicated otherwise, parts are parts by weight, temperature is in degrees Celsius or is at room temperature, and pressure is at or near atmospheric.

For the purposes of this invention, the term "wt" means "weight". Mw refers to weight average molecular weight and Mn refers to number average molecular weight.

The inherent viscosity (I.V.) of the polyesters was determined in 60/40 (wt/wt) phenol/tetrachloroethane at a concentration of 0.5 g/100 ml at 25° C.

Unless stated otherwise, the glass transition temperature (Tg) was determined using a TA DSC 2920 instrument from Thermal Analyst Instruments at a scan rate of 20 C/min according to ASTM D3418. The sample being measured should have been heated above its melting point and quenched prior to the scan.

The glycol content and the cis/trans ratio of polyester compositions used in herein were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. Peak assignments for 2,2,4,4-tetramethyl-1,3-cyclobutanediol (TMCD) resonances were made by comparison to model mono- and dibenzoate esters of 2,2,4,4-tetramethyl-1,3-cyclobutanediol. These model compounds closely approximate the resonance positions found in the polymers and oligomers.

The polydispersity index (PDI) or heterogeneity index as used in these examples is a measure of the distribution of molecular mass in a given polymer sample. The PDI calculated herein is the weight average molecular weight Mw) divided by th number average molecular weight (Mn)).

Abbreviations used herein are included in the following Table:

| | |
|---|---|
| TACD | 2,2,4,4-Tetraalkylcyclobutane-1,3-diol |
| DMPA | 2,2-Bis(hydroxymethyl) dimethylolpropionic acid |
| TMCD | 2,2,4,4-Tetramethylcyclobutane-1,3-diol |
| DMEA | dimethylethanolamine |
| Tg | Glass transition temperature |
| DLS | Dynamic light scattering |
| IPA | Isophthalic acid |
| CHDA | Cyclohexanedicarboxylic acid |
| CHDM | 1,4-Cyclohexanedimethanol |
| NPG | Neopentyl glycol |
| Mn | Number average molecular weight |
| Mw | Weight average molecular weight |
| PDI | The polydispersity index (PDI) |

Example 1. Synthesis of DMPA-Containing Polyester A

The reactants: TMCD (34.61 g, 0.24 moles), DMPA (8.05 g, 0.06 moles), CHDA (30.13 g, 0.175 moles), adipic acid (10.96 g, 0.075 moles), catalyst Fascat 4102 (butyltin tris-2-ethylhexanoate, 0.36 g), and tris(2,4-di-tert-butylphenyl) phosphite (0.08 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 20 min., 240° C. under 5 torr vacuum for 15 min., and 240° C. under 1 torr vacuum for 25 min. The product was a viscous mixture that was cooled to room temperature to form a solid which was collected for analysis. (Tg 42° C.; Mn 4035; Mw 14786; PDI=3.66; acid number 31; hydroxyl number 36)

Example 2. Synthesis of DMPA-Containing Polyester B

The reactants: TMCD (36.77 g, 0.255 moles), DMPA (6.04 g, 0.045 moles), CHDA (30.12 g, 0.175 moles), adipic acid (10.96 g, 0.075 moles), catalyst Fascat 4102 (butyltin tris-2-ethylhexanoate, 0.36 g), and tris(2,4-di-tert-butylphenyl) phosphite (0.08 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 20 min., 240° C. under 5 torr vacuum for 15 min., and 240° C. under 1 torr vacuum for 25 min. The product was a viscous mixture that was cooled to room temperature to form a solid which was collected for analysis. (Tg 40° C.; Mn 3632; Mw 10732; PDI=2.855; acid number 24; hydroxyl number 40)

Example 3. Synthesis of DMPA-Containing Polyester C

The reactants: TMCD (38.94 g, 0.27 moles), DMPA (4.02 g, 0.03 moles), CHDA (30.12 g, 0.175 moles), adipic acid (10.96 g, 0.075 moles), catalyst Fascat 4102 (butyltin tris-2-ethylhexanoate, 0.36 g), and tris(2,4-di-tert-butylphenyl) phosphite (0.08 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 20 min., 240° C. under 5 torr vacuum for 15 min., and 240° C. under 1 torr vacuum for 25 min. The product was a viscous mixture that was cooled to room temperature to form a solid which was collected for analysis. (Tg 34° C.; Mn 2765; Mw 6524; PDI=2.35; acid number 21; hydroxyl number 49)

Example 4. Synthesis of DMPA-Containing Polyester D

The reactants: TMCD (41.1 g, 0.2850 moles), DMPA (2.01 g, 0.015 moles), CHDA (30.12 g, 0.175 moles), adipic acid (10.96 g, 0.075 moles), catalyst Fascat 4102 (butyltin tris-2-ethylhexanoate, 0.36 g), and tris(2,4-di-tert-butylphenyl) phosphite (0.08 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 20 min., 240° C. under 5 torr vacuum for 15 min., and 240° C. under 1 torr vacuum for 25 min. The product was a viscous mixture that was cooled to room temperature to form a solid which was collected for analysis. (Tg 34° C.; Mn 2382; Mw 5603; PDI=2.35; acid number 13; hydroxyl number 49)

Example 5. Synthesis of DMPA-Containing Polyester E

The reactants: TMCD (93.45 g, 0.648 moles), DMPA (9.66 g, 0.072 moles), adipic acid (87.68 g, 0.6 moles), catalyst Fascat 4102 (butyltin tris-2-ethylhexanoate, 0.83 g), and tris(2,4-di-tert-butylphenyl) phosphite (0.191 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 20 min., 240° C. under 5 torr vacuum for 15 min., and 240° C. under 1 torr vacuum for 25 min. The product was a viscous mixture that was cooled using dry ice to form a solid which was collected for analysis. (Tg—14° C.; Mn 3344; Mw 9066; PDI=2.71; acid number 15; hydroxyl number 49)

Example 6. Synthesis of DMPA-Containing Polyester F

The reactants: TMCD (76.14 g, 0.528 moles), DMPA (17.71 g, 0.132 moles), CHDA (103.31 g, 0.6 moles), catalyst Fascat 4102 (butyltin tris-2-ethylhexanoate, 0.858 g), and tris(2,4-di-tert-butylphenyl) phosphite (0.197 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 20 min., 240° C. under 5 torr vacuum for 15 min., and 240° C. under 1 torr vacuum for 25 min. The product was a viscous mixture that was cooled to room temperature to form a solid which was collected for analysis. (Tg 75° C.; Mn 3247; Mw 14061; PDI=4.33; acid number 46; hydroxyl number 21)

Example 7. Synthesis of DMPA-Containing Polyester G

The reactants: TMCD (85.66 g, 0.594 moles), DMPA (8.85 g, 0.066 moles), CHDA (51.65 g, 0.3 moles), adipic acid (43.84 g, 0.3 moles), catalyst Fascat 4102 (butyltin tris-2-ethylhexanoate, 0.827 g), and tris(2,4-di-tert-butylphenyl) phosphite (0.190 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 20 min., 240° C. under 5 torr vacuum for 15 min., and 240° C. under 1 torr vacuum for 25 min. The product was a viscous mixture that was cooled to room temperature to form a solid which was collected for analysis. (Tg 22° C.; Mn 3507; Mw 9090; PDI=2.59; acid number 30; hydroxyl number 27)

Example 8. Preparation of Aqueous Dispersion 1

DMPA-containing polyester G was first ground to about 6 mm pellets, which were used to prepare a 41 wt % solids dispersion in a Parr reactor. The resin pellets (50 g) were added to the reaction vessel with distilled water (75.4 g) and DMEA (1.55 grams) as the neutralizing agent. The amount of DMEA added (65% of complete neutralization) was calculated from the acid number of the resin. The Parr reactor was assembled and the contents heated to 85° C. under rapid stirring. The stirring continued at 85° C. for 60 min., then the reaction vessel was cooled to 40° C. before the resulting dispersion was poured out through a standard 260 micron paint filter. The resultant translucent, homogenous dispersion was analyzed for particle size using a DLS instrument (mean particle size about 25 nm). After 8 months storage at room temperature, this dispersion remained a free flowing dispersion and displayed no significant changes in particle size or resin molecular weight. This demonstrates the dispersion's stability.

Example 9. Synthesis of DMPA-Containing Polyester H

The reactants: TMCD (88.98 g, 0.617 moles), DMPA (13.81 g, 0.103 moles), CHDA (77.48 g, 0.45 moles), adipic acid (21.92 g, 0.15 moles), catalyst Fascat 4102 (butyltin tris-2-ethylhexanoate, 0.88 g), and tris(2,4-di-tert-butylphenyl) phosphite (0.202 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 20 min., 240° C. under 5 torr vacuum for 15 min., and 240° C. under 1 torr vacuum for 25 min. The product was a viscous mixture that was cooled to room temperature to form a solid which was collected for analysis. (Tg 42° C.; Mn 3035; Mw 8436; PDI=2.77; acid number 29; hydroxyl number 42)

Example 10. Synthesis of DMPA-Containing Polyester I With NPG-Without TMCD

The reactants: NPG (22.91 g, 0.22 moles), DMPA (7.38 g, 0.055 moles), CHDA (30.13 g, 0.175 moles), adipic acid (10.96 g, 0.075 moles), catalyst Fascat 4102 (butyltin tris-2-ethylhexanoate, 0.31 g), and tris(2,4-di-tert-butylphenyl) phosphite (0.07 g), were charged to a 500-mL round-bottom flask equipped with a mechanical stirrer, nitrogen inlet, and distillation arm with graduated cylinder to collect water. The reaction mixture was allowed to react under nitrogen at 190° C. for 50 min., at 210° C. for 50 min., 230° C. for 50 min., 240° C. for 50 min., 240° C. under 100 torr vacuum for 10 min. After this application of vacuum, the reaction mixture gelled rapidly, forming an unusable product.

Example 11. Synthesis of DMPA-Containing Polyester J With NPG-Without TMCD

The reactants: NPG (59.99 g, 0.576 moles), DMPA (19.31 g, 0.144 moles), CHDA (103.31 g, 0.6 moles), catalyst Fascat 4102 (butyltin tris-2-ethylhexanoate, 0.79 g), and tris(2,4-di-tert-butylphenyl) phosphite (0.18 g), were charged to a 500-mL round-bottom flask equipped with a mechanical stirrer, nitrogen inlet, and distillation arm with graduated cylinder to collect water. The reaction mixture was allowed to react under nitrogen at 190° C. for 75 min., at 200° C. for 110 min., 200° C. under 100 torr vacuum for 20 min., 200° C. under 5 torr vacuum for 25 min., 200° C. under 1 torr vacuum for 55 min. The product was a viscous mixture that was cooled using dry ice to form a solid which was collected for analysis. TMCD permits the synthesis of resins with higher Tg, as in Example 6. (Tg 20° C.; Mn 1721; Mw 10557; PDI=6.13; acid number 39; hydroxyl number 49). This reaction required careful control to prevent gelation, and resulted in a higher PDI with lower Mn than TMCD analogues. The tendency for gelation with reactive diols such as NPG increases the difficulty of targeting key properties such as molecular weight, acid number, and hydroxyl number, and limits the maximum obtainable values.

Example 12. Preparation of Aqueous Dispersion 2

DMPA-containing polyester with NPG (polyester J)—without TMCD was first ground to about 6 mm pellets, which were used to prepare a 41 wt % solids dispersion in a Parr reactor. The resin pellets (40 g) were added to the reaction vessel with distilled water (61.13 g) and DMEA (1.61 grams) as the neutralizing agent. The amount of DMEA added (65% of complete neutralization) was calculated from the acid number of the resin. The Parr reactor was assembled and the contents heated to 85° C. under rapid stirring. The stirring continued at 85° C. for 60 min., then the reaction vessel was cooled to 40° C. before the resulting dispersion was poured out through a standard 260 micron paint filter. The resultant translucent, homogenous dispersion was analyzed for particle size using a DLS instrument (mean particle size about 20 nm). After 3 months storage at room temperature, this dispersion had begun to form solid, non-dispersed material, and large sized particles (larger than 1 micron) were observed in DLS. Both of these demonstrate the dispersion's instability.

Example 13. Synthesis of DMPA-Containing Polyester K with CHDM-Without TMCD

The reactants: CHDM (74.7 g, 0.518 moles), DMPA (19.31 g, 0.144 moles), CHDA (103.31 g, 0.6 moles), catalyst Fascat 4102 (butyltin tris-2-ethylhexanoate, 0.79 g), and tris(2,4-di-tert-butylphenyl) phosphite (0.18 g), were charged to a 500-mL round-bottom flask equipped with a mechanical stirrer, nitrogen inlet, and distillation arm with graduated cylinder to collect water. The reaction mixture was allowed to react under nitrogen at 190° C. for 75 min., at 200° C. for 110 min., 200° C. under 100 torr vacuum for 20 min., 200° C. under 5 torr vacuum for 25 min., 200° C. under 1 torr vacuum for 10 min. After this, the reaction mixture gelled rapidly, forming an unusable product.

Example 14. Synthesis of DMPA-Containing Polyester L With CHDM-Without TMCD

The reactants: CHDM (83.06 g, 0.576 moles), DMPA (19.31 g, 0.144 moles), CHDA (103.31 g, 0.6 moles), catalyst Fascat 4102 (butyltin tris-2-ethylhexanoate, 0.89 g), and tris(2,4-di-tert-butylphenyl) phosphite (0.21 g), were charged to a 500-mL round-bottom flask equipped with a mechanical stirrer, nitrogen inlet, and distillation arm with graduated cylinder to collect water. The reaction mixture was allowed to react under nitrogen at 180° C. for 75 min., at 190° C. for 110 min., 190° C. under 100 torr vacuum for 20 min., 190° C. under 5 torr vacuum for 25 min., 190° C. under 1 torr vacuum for 30 min. The product was a viscous mixture that was cooled using dry ice to form a solid which was collected for analysis. (Tg 32° C.; Mn 2717; Mw 9585; PDI=3.52; acid number 29; hydroxyl number 60). This reaction required careful control to prevent gelation. The tendency for gelation with reactive diols such as CHDM increases the difficulty of targeting key properties such as molecular weight, acid number, and hydroxyl number, and limits the maximum obtainable values. TMCD permits the synthesis of resins with higher Tg, as in example 6.

Example 15. Preparation of Aqueous Dispersion 3

DMPA-containing polyester DMPA-containing polyester (polyester L) with CHDM—without TMCD was first ground to about 6 mm pellets, which were used to prepare a 41 wt % solids dispersion in a Parr reactor. The resin pellets (40 g) were added to the reaction vessel with distilled water (60.41 g) and DMEA (1.88 grams) as the neutralizing agent. The amount of DMEA added (95% of complete neutralization) was calculated from the acid number of the resin. The Parr reactor was assembled and the contents heated to 85° C. under rapid stirring. The stirring continued at 85° C. for 60 min., then the reaction vessel was cooled to 40° C. before the resulting dispersion was poured out through a standard 260 micron paint filter. The resultant opaque, homogenous dispersion was analyzed for particle size using a DLS instrument (mean particle size about 300 nm). This dispersion resulted in a larger mean particle size than TMCD analogues with similar acid numbers (as in example 8). Larger particle sizes may not be useful for certain applications, and smaller particle sizes indicate increased dispersibility. After 9 months storage at room temperature, this dispersion had begun to form solid, non-dispersed material, and large sized particles (larger than 1 micron) were observed in DLS. Both of these demonstrate the dispersion's instability.

Example 16. Synthesis of DMPA-Containing Polyester M

The reactants: TMCD (83.06 g, 0.576 moles), isophthalic acid (99.68 g, 0.6 moles), catalyst Fascat 4102 (butyltin tris-2-ethylhexanoate, 0.88 g) and tris(2,4-di-tert-butylphe-nyl) phosphite (0.20 g), were charged to a 500-mL two-necked round-bottom flask equipped with a mechanical stirrer, nitrogen inlet, and distillation arm with graduated cylinder to collect water. The reaction mixture was allowed to react under nitrogen ramping from 180° C. to 230° C. over the course of 300 min., then ramped from 230° C. to 235° C. over the course of 90 min. At this point the reaction mixture was clear and homogenous, and DMPA (19.31 g, 0.144 moles) was added to the reaction mixture. The reaction mixture was then reacted ramping from 235° C. to 240° C. over the course of 90 min., then reacted at 240° C. under 100 torr vacuum for 10 min., 240° C. under 5 torr vacuum for 15 min., and 240° C. under 1 torr vacuum for 25 min. The product was a viscous mixture that was cooled to room temperature to form a solid which was collected for analysis. (Tg 110° C.; Mn 2473; PDI=10.6; Mw 26222; acid number 42; hydroxyl number 30). The total reaction time for this Example 16 was 515 minutes and the highest reaction temperature used was 240 degrees C. The total reaction time in Example 1 [which employs the use of adipic acid and CHDA instead of isophthalic acid (the later as used in this Example 16)] was 225 minutes and the highest reaction temperature used was 240 degree C. although the overall temperatures were cooler than those employed in Example 16. The total reaction time in Example 19 (which also exemplified isophthalic acid] was 240 minutes at overall cooler temperatures than in Example 16. Example 19 was run after Example 16 for the purpose of analyzing whether a polyester could be made by using less strenuous conditions without gelling of the polyester. However, in Example 18, essentially the same reaction as in Example 16 was run using neopentyl glycol instead of TMCD at the same conditions and it gelled. This shows that the use of TMCD in an isophthalic acid containing polyester, whether or not using enhanced conditions, provides the advantage of being able to make a viable polyester even under harsh conditions whereas substituting neopentyl glycol caused gelling of the polyester.

Example 17. Preparation of Aqueous Dispersion 4

DMPA-containing polyester M was first ground to about 6 mm pellets, which were used to prepare a 30 wt % solids dispersion in a Parr reactor. The resin pellets (50 g) were added to the reaction vessel with distilled water (115.65 g), EB (8.8 g as co-solvent), and DMEA (3.21 grams) as the neutralizing agent. The amount of DMEA added (95% of complete neutralization) was calculated from the acid number of the resin. The Parr reactor was assembled and the contents heated to 110° C. under rapid stirring. The stirring continued at 110° C. for 60 min., then the reaction vessel was cooled to 40° C. before the resulting dispersion was poured out through a standard 260 micron paint filter. The resultant translucent, homogenous dispersion was analyzed for particle size using a DLS instrument (mean particle size about 35 nm). After 10 months storage at room temperature, this dispersion remained a free flowing dispersion and displayed no significant changes in particle size or resin molecular weight. This demonstrates the dispersion's stability.

Example 18. Synthesis of DMPA-Containing Polyester N

The reactants: NPG (59.99 g, 0.576 moles), isophthalic acid (99.68 g, 0.6 moles), catalyst Fascat 4102 (butyltin tris-2-ethylhexanoate, 0.88 g) and tris(2,4-di-tert-butylphenyl) phosphite (0.20 g), were charged to a 500-mL two-necked round-bottom flask equipped with a mechanical stirrer, nitrogen inlet, and distillation arm with graduated cylinder to collect water. The reaction mixture was allowed to react under nitrogen ramping from 180° C. to 230° C. over the course of 300 min., then ramped from 230° C. to 235° C. over the course of 90 min. At this point the reaction mixture was clear and homogenous, and DMPA (19.31 g, 0.144 moles) was added to the reaction mixture. The reaction mixture was then reacted ramping from 235° C. to 240° C. over the course of 90 min., then reacted at 240° C. under 100 torr vacuum for 10 min. During this 10 minutes at 240° C. under 100 torr vacuum, the reaction mixture gelled rapidly, forming an unusable product.

Example 19. Synthesis of DMPA-Containing Polyester O

The reactants: TMCD (101.24 g, 0.702 moles), isophthalic acid (99.68 g, 0.6 moles), and catalyst Fascat 4102 (butyltin tris-2-ethylhexanoate, 0.920 g) were charged to a 500-mL two-necked round-bottom flask equipped with a mechanical stirrer, nitrogen inlet, and distillation arm with graduated cylinder to collect water. The reaction mixture was allowed to react under nitrogen at 180° C. for 60 min., at 200° C. for 60 min., 220° C. for 120 min., and 230° C. for 60 min. At this point the reaction mixture was clear and homogenous, and DMPA (10.46 g, 0.078 moles) was added to the reaction mixture. The reaction mixture was allowed to further react at 230° C. for 60 min and 240° C. for 120 min. The product was a viscous mixture that was cooled to room temperature to form a solid which was collected for analysis. (Tg 88° C.; Mn 1945; Mw 4475; PDI=2.30; acid number 20; hydroxyl number 71).

Example 20. Synthesis of DMPA-Containing Polyester P

The reactants: TMCD (97.34 g, 0.675 moles), isophthalic acid (99.68 g, 0.6 moles), and catalyst Fascat 4102 (butyltin tris-2-ethylhexanoate, 0.901 g) were charged to a 500-mL two-necked round-bottom flask equipped with a mechanical stirrer, nitrogen inlet, and distillation arm with graduated cylinder to collect water. The reaction mixture was allowed to react under nitrogen at 180° C. for 60 min., at 200° C. for 60 min., 220° C. for 120 min., and 230° C. for 60 min. At this point the reaction mixture was clear and homogenous, and DMPA (10.06 g, 0.075 moles) was added to the reaction mixture. The reaction mixture was allowed to further react at 230° C. for 60 min and 240° C. for 120 min. The product was a viscous mixture that was cooled to room temperature to form a solid which was collected for analysis. (Tg 97° C.; Mn 1907; Mw 4798; PDI=2.51; acid number 36; hydroxyl number 50)

The invention has been described in detail with reference to the embodiments disclosed herein, but it will be understood that variations and modifications can be effected within the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. Further, ranges provided for a genus or a category, can also be applied to species within the genus or members of the category, unless otherwise noted.

We claim:

1. A free flowing aqueous dispersion comprising:
   (a) at least one polyester consisting of the residues of:
      (i) 2,2,4,4-tetramethylcyclobutane-1,3-diol;
      (ii) 2,2-bis(hydroxymethyl) dimethylolpropionic acid:
      (iii) at least one polycarboxylic acid and/or a derivative thereof selected from the group consisting of 1,2-cyclohexanedicarboxylic, 1,3-cyclohexanedicarboxylic, 1,4-cyclohexanedicarboxylic and adipic acid;
   wherein said polyester has an acid number in the range of 10 to 100 mg KOH/g, a hydroxyl number in the range of 20 to 120 mg KOH/g and a number average molecular weight of 500 to 5000;
   (b) at least one neutralizing agent; and
   (c) water;
   wherein said aqueous dispersion has a mean particle size of no greater than 1 micron.

2. The dispersion of claim 1 further comprising an organic co-solvent.

3. The dispersion of claim 1 wherein said neutralizing agent is ammonia, trimethylamine, diethylamine, monoethanolamine, monoisopropanolamine, morpholine, ethanolamine, diethanolamine, triethanolamine, 2-amino-2-methyl-1-propanol, N,N-dimethylethanolamine, N,N-diethylethanolamine, N-methyldiethanolamine, sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, and sodium pyrophosphate or a combination thereof.

* * * * *